United States Patent
Nakamura

(10) Patent No.: US 10,097,722 B1
(45) Date of Patent: Oct. 9, 2018

(54) IMAGE READING APPARATUS

(71) Applicant: Brother Kogyo Kabushiki Kaisha, Nagoya (JP)

(72) Inventor: Naoyuki Nakamura, Nagoya (JP)

(73) Assignee: Brother Kogyo Kabushikia Kaisha, Nagoya-Shi (JP)

( * ) Notice: Subject to any disclaimer, the term of this patent is extended or adjusted under 35 U.S.C. 154(b) by 0 days.

(21) Appl. No.: 15/928,358

(22) Filed: Mar. 22, 2018

(30) Foreign Application Priority Data

Sep. 29, 2017 (JP) .................... 2017-189935

(51) Int. Cl.
*H04N 1/047* (2006.01)
*H04N 1/00* (2006.01)

(52) U.S. Cl.
CPC ......... *H04N 1/0473* (2013.01); *H04N 1/0066* (2013.01); *H04N 1/00588* (2013.01)

(58) Field of Classification Search
CPC ................... H04N 1/0473; H04N 1/00588
See application file for complete search history.

(56) References Cited

U.S. PATENT DOCUMENTS

| | | | |
|---|---|---|---|
| 9,479,661 B2* | 10/2016 | Watanabe | H04N 1/00705 |
| 2013/0003136 A1* | 1/2013 | Osakabe | H04N 1/00588 |
| | | | 358/449 |
| 2014/0212049 A1* | 7/2014 | Honda | G06T 7/0085 |
| | | | 382/199 |
| 2015/0373218 A1 | 12/2015 | Watanabe | |

FOREIGN PATENT DOCUMENTS

| | | |
|---|---|---|
| JP | H10-276317 A | 10/1998 |
| JP | 2002-197449 A | 7/2002 |
| JP | 2002-199179 A | 7/2002 |
| JP | 2008-147976 A | 6/2008 |
| JP | 2013-115617 A | 6/2013 |
| JP | 2014-147046 A | 8/2014 |
| JP | 2016-005186 A | 1/2016 |

* cited by examiner

*Primary Examiner* — Ibrahim Siddo
(74) *Attorney, Agent, or Firm* — Burr & Brown, PLLC

(57) ABSTRACT

An image reading apparatus, having a conveyer, a sheet tray, an obtaining device, a memory, a determining device, and a controller, is provided. The controller determines whether information concerning pixels in the memory indicates edge positions or edge absence in in read-image data concerning a sheet, detects an upstream leading-end position and a downstream leading-end position, detects upstream continuing pixels and downstream continuing pixels, detects an upstream lateral-end position and a downstream lateral-end position, calculates a line representing an upper end of the sheet based on the upstream leading-end position and the downstream leading-end position, calculates an upstream corner position and a downstream corner position based on the upstream and downstream lateral-end positions and the line representing the upper end of the sheet, and calculates a width of the sheet based on the upstream corner position and the downstream corner position.

8 Claims, 14 Drawing Sheets

FIG. 12A

Data arrangement in the RAM 42

| MAIN-SCANNER POSITION MDP | 1 | 2 | 3 | ... | 1241 | ... | 2231 | 2232 | ... | 2451 | ... | 2461 | ... | 2471 | ... | 2481 |
|---|---|---|---|---|---|---|---|---|---|---|---|---|---|---|---|---|
| EDGE DATA ED | 0 | 0 | 160 | ... | 100 | ... | 1 | 0 | ... | 0 | ... | 45 | ... | 90 | ... | 135 |

Central pixel position at 1241

IMAGE READING APPARATUS

CROSS REFERENCE TO RELATED APPLICATION

This application claims priority from Japanese Patent Application No. 2017-189935, filed on Sep. 29, 2017, the entire subject matter of which is incorporated herein by reference.

BACKGROUND

Technical Field

An aspect of the present disclosure is related to an image reading apparatus.

Related Art

An image processing apparatus capable of detecting a sheet edge being an edge of an original sheet with a source image thereon is known. The image processing apparatus may first detect the sheet edge at a central position in a main-scanning direction and scan upstream, e.g., leftward, from the central position in the main-scanning direction to consecutively detect the sheet edge within a predetermined range in a sub-scanning direction. When the sheet edge is no longer detected in the main-scanning direction, the image processing apparatus may save a position where the sheet edge was detected lastly as a leftward corner of the sheet edge. Next, the image processing apparatus may scan the sheet edge downstream, e.g., rightward, along the main-scanning direction from the central position to consecutively detect the sheet edge within the predetermined range in the sub-scanning direction. When the sheet edge is no longer detected in the main-scanning direction, the image processing apparatus may save a position where the sheet was detected lastly as a rightward corner of the sheet edge. The image processing apparatus may calculate a linear function representing the sheet edge to retrieve inclination of the original sheet and calculate a size of the original sheet based on the positions of the leftward corner and the rightward corner of the sheet edge so that skew of the source image may be corrected in image data, which is generated from the source image having been read, and peripheral areas of the source image may be trimmed in the skew-corrected image data based on the calculated sheet size.

SUMMARY

While the image processing apparatus may determine the position of the edge detected lastly in the upstream or downstream scanning direction along the main-scanning direction as the corner of the sheet edge, an off-centered part of the skewed sheet edge may pass over a reading position of the image processing apparatus without being read. In such an occasion, the image processing apparatus may start reading the source image at a midst position in the source image and save a midst position in the sheet edge erroneously as a leftward or rightward corner of the sheet edge. In this regard, a dimension, i.e., width, of the original sheet in the main-scanning direction may not be detected accurately, and a size of the sheet may not be determined correctly.

The present invention is advantageous in that an image reading apparatus, which is capable of accurately determining a sheet width, i.e., a size of an original sheet in a main-scanning direction, even when the original sheet skews, and when the image reading apparatus starts reading an image in a leading end area of the original sheet at a midst position.

According to an aspect of the present disclosure, an image reading apparatus, having a conveyer, a sheet tray, an obtaining device, a memory, a determining device, and a controller, is provided. The conveyer is configured to convey a sheet to be read downstream along a sub-scanning direction. The sheet tray is configured to support the sheet at a position on a supporting surface with reference to a central position located at a center of the supporting surface in a main-scanning direction, which intersects orthogonally with the sub-scanning direction. The obtaining device includes a line sensor, having a plurality of sensor components aligning in line along the main-scanning direction. The plurality of sensor components include a foremost sensor component located at a most upstream position in the line along the main-scanning direction and a rearmost sensor component located at a most downstream position in the line along the main-scanning direction. Each sensor component is configured to read an image element corresponding to a pixel on the sheet. The line sensor is configured to read a plurality of lines of images extending along the main-scanning direction on the sheet being conveyed from the sheet tray downstream in the sub-scanning direction. The obtaining device is configured to obtain read-image data including image data of the plurality of lines of images read by the line sensor. The determining device is configured to determine edge positions contained in a predetermined area defined by a main-scanning range and a sub-scanning range in the read-image data and store information concerning pixels in the predetermined area indicating the edge positions in a storage area in the memory. The main-scanning range is a range of pixels in the read-image data aligning along the main-scanning direction between a foremost pixel position, which is a position of pixels read by the foremost sensor component, and a rearmost pixel position, which is a position of pixels read by the rearmost sensor component. The sub-scanning range is a range of pixels in the read-image data aligning along the sub-scanning direction between an upstream pixel position, which is a position of pixels in a most upstream line among the plurality of lines of images, and a pixel position of another line of pixels, which are apart downstream in the sub-scanning direction from the upstream pixel position for a first predetermined distance. The determining device is configured to search for edges of the sheet through the pixels in the predetermined area in the read-image data from the upstream pixel position downstream along the sub-scanning direction at each pixel position in the main-scanning direction. The determining device is configured to save the pixel position in the main-scanning direction in the storage area in the memory as the information indicating the edge position if colors in the pixels within the sub-scanning range in the read-image data shifted from white to black along the sub-scanning direction for a first time at the pixel position in the main-scanning direction. The determining device is configured to save information indicating edge absence in the storage area in the memory if the colors in the pixels within the sub-scanning range in the read-image data do not shift from white to black at the pixel position in the main-scanning direction. The controller is configured to examine the information concerning the pixels stored in the storage area in the memory along the main-scanning direction consecutively upstream from a central pixel position, which is a position of pixels read by a central sensor component among the plurality of sensor components located at the central position, to the foremost pixel position and determine whether the information concerning each of the examined pixels indicates the edge position or edge absence; detect a pixel position, which is farthest upstream from the central pixel position along the main-scanning direction and of which information concerning the pixel in the storage area in the memory is determined to indicate the edge position, as an upstream leading-end position, among the pixel positions within a range along the main-scanning direction between the central pixel position and an upstream no-edge pixel position, which is upstream from the central pixel position in the main-scanning direction and of which information concerning the pixel in the storage area in the memory is determined to indicate edge absence; examine the information concerning the pixels stored in the storage area in the memory along the main-scanning direction consecutively downstream from the central pixel position to the rearmost pixel position and determine whether the information concerning each of the examined pixels indicates the edge position or edge absence; detect a pixel position, which is farthest downstream from the central pixel position along the main-scanning direction and of which information concerning the pixel in the storage area in the memory is determined to indicate the edge position, as a downstream leading-end position, among the pixel positions within a range along the main-scanning direction between the central pixel position and a downstream no-edge pixel position, which is downstream from the central pixel position in the main-scanning direction and of which information concerning the pixel in the storage area in the memory is determined to indicate edge absence; detect pixel positions, of which information concerning the pixels in the storage area in the memory is determined to indicate the edge positions sequentially, as upstream continuing pixel positions, among the pixel positions within a range along the main-scanning direction between the upstream no-edge pixel position and the foremost pixel position; detect a pixel position, which is farthest from the central pixel position along the main-scanning direction, among the upstream continuing pixel positions as an upstream lateral-end position; detect pixel positions, of which information concerning the pixels in the storage area in the memory is determined to indicate the edge positions sequentially, as downstream continuing pixel positions, among the pixel positions within a range along the main-scanning direction between the downstream no-edge pixel position and the rearmost pixel position; detect a pixel position, which is farthest from the central pixel position along the main-scanning direction, among the downstream continuing pixel positions as a downstream lateral-end position; calculate a line representing an upper end of the sheet based on the upstream leading-end position and the downstream leading-end position; calculate an upstream corner position based on the upstream lateral-end position and the line representing the upper end of the sheet; calculate a downstream corner position based on the downstream lateral-end position and the line representing the upper end of the sheet; and calculate a width of the sheet in the main-scanning direction based on the upstream corner position and the downstream corner position.

BRIEF DESCRIPTION OF THE ACCOMPANYING DRAWINGS

Figure 3:
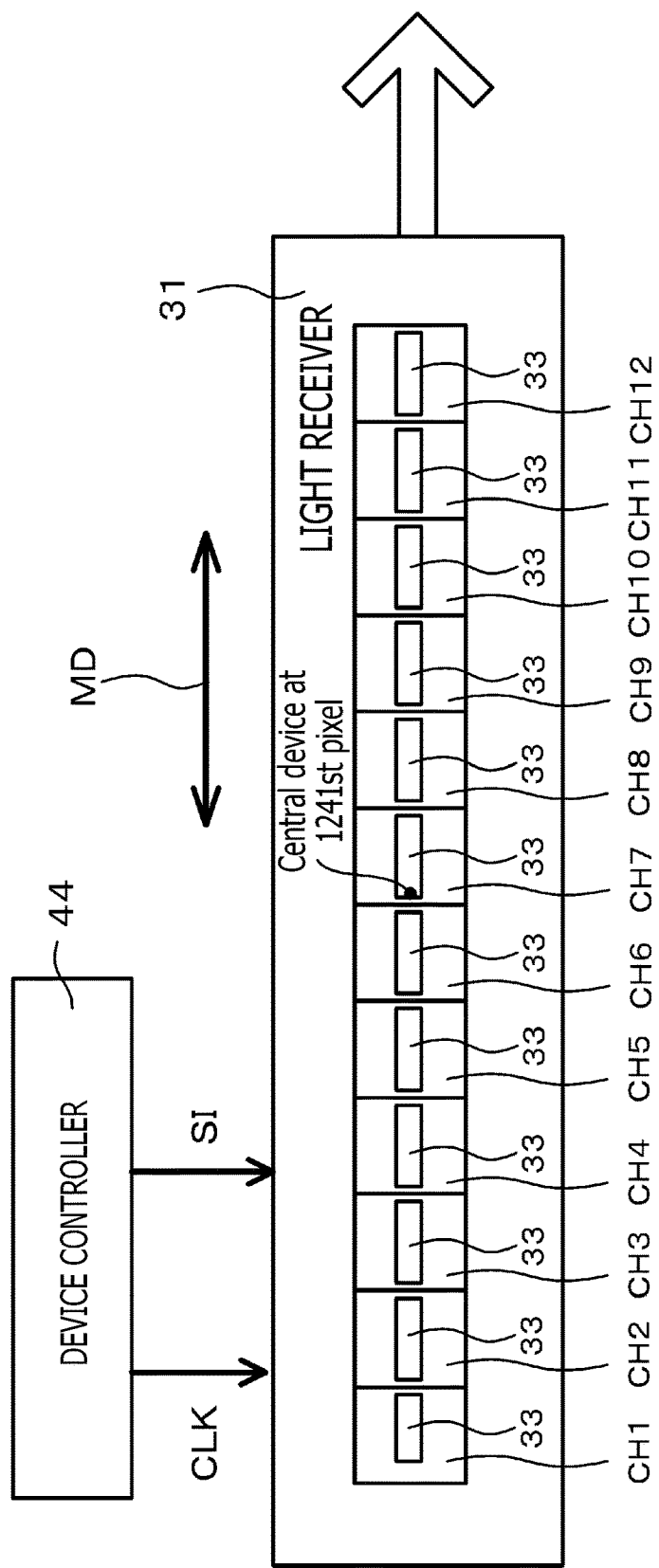

FIG. 3 is a block diagram to illustrate a configuration in a light receiver 31 in the image reader 24 in the image reading apparatus 1 according to the embodiment of the present disclosure.

Figure 4:
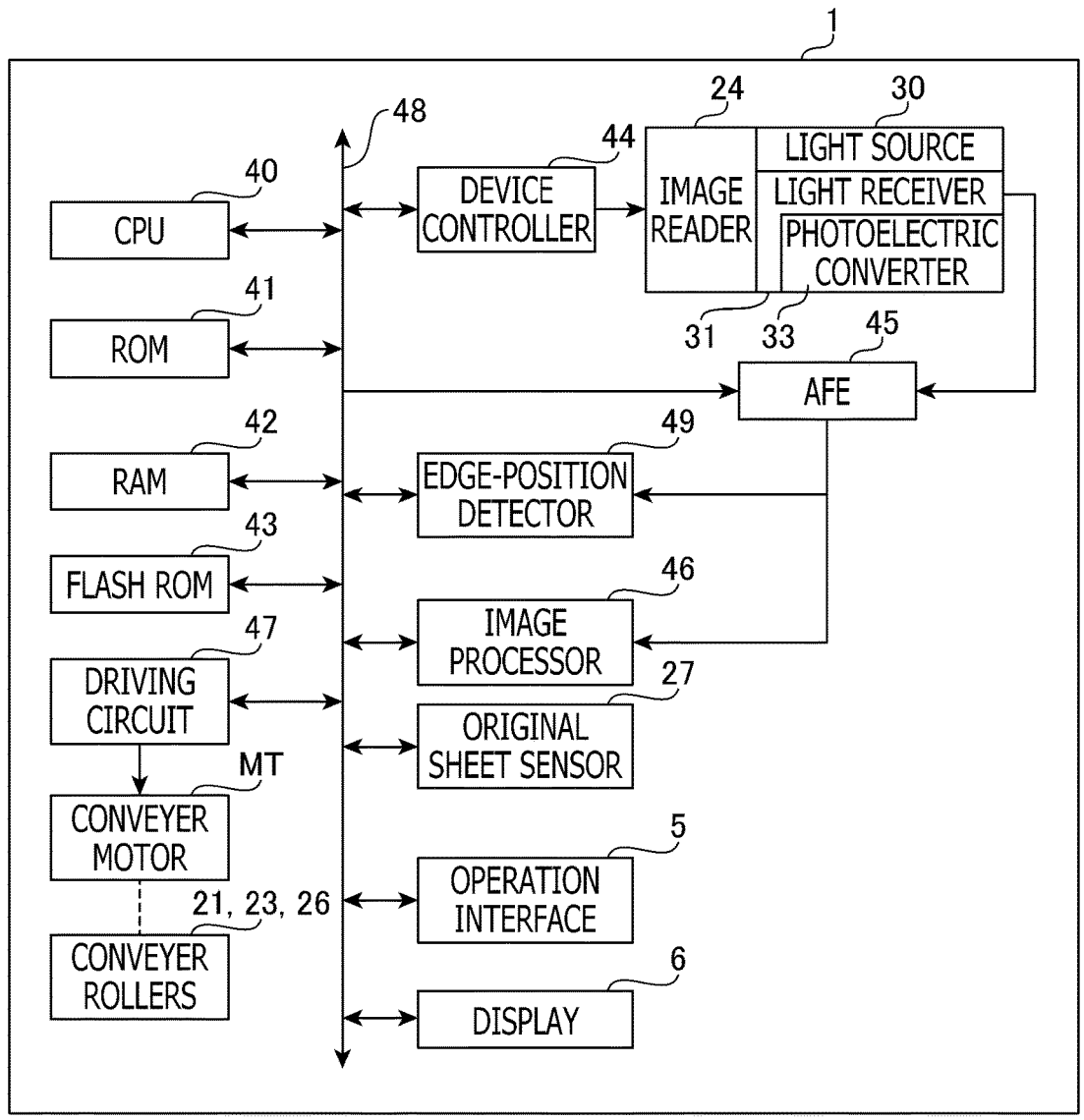

FIG. 4 is a block diagram to illustrate an electrical configuration in the image reading apparatus 1 according to the embodiment of the present disclosure.

Figure 5:
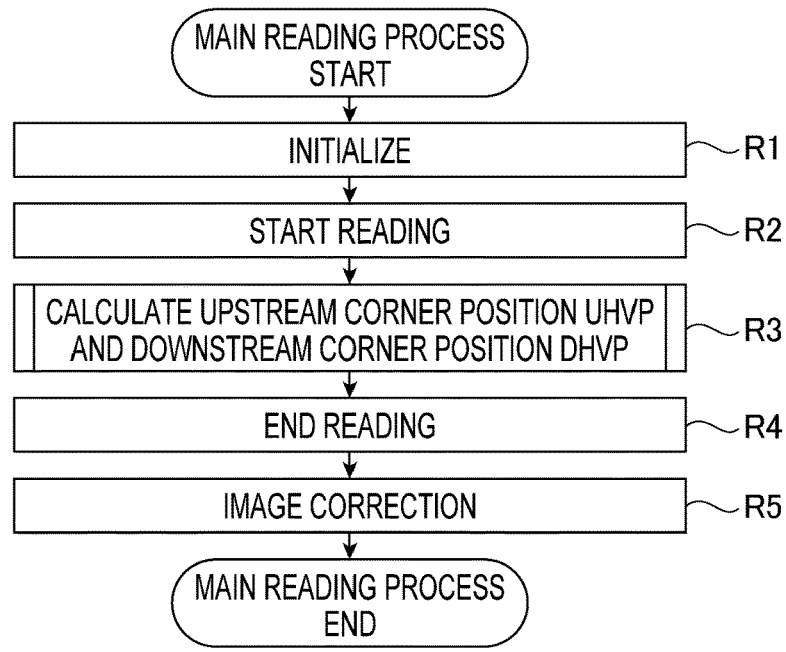

FIG. 5 is a flowchart to illustrate a main reading process to be executed in the image reading apparatus 1 according to the embodiment of the present disclosure.

Figure 6:
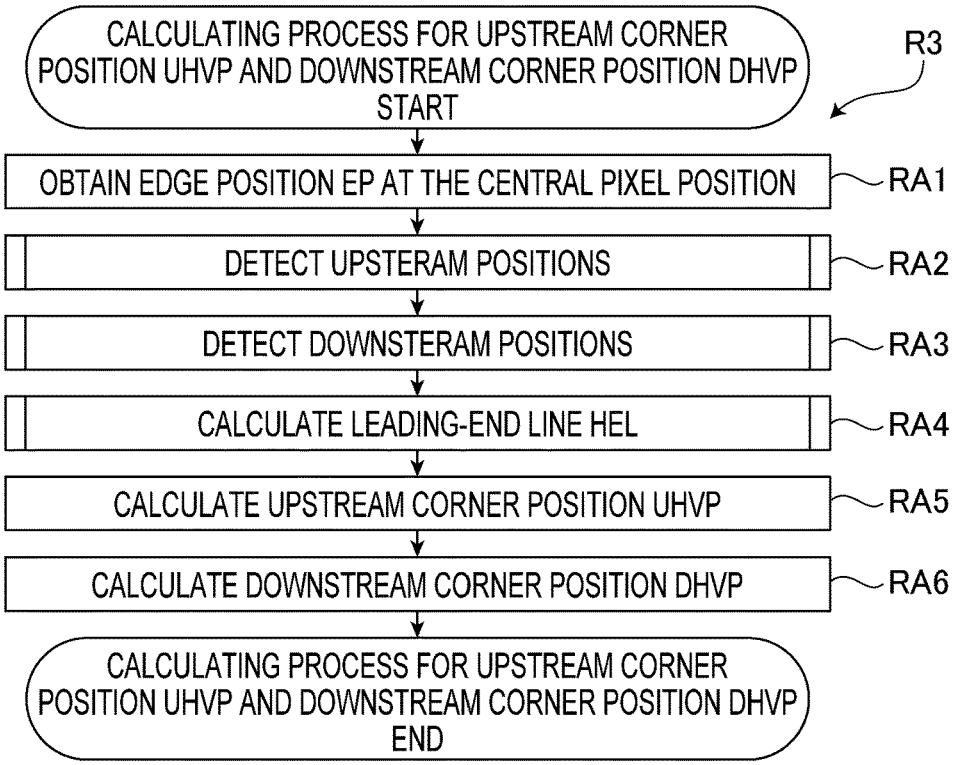

FIG. 6 is a flowchart to illustrate a calculating process R3 to detect an upstream corner position UHVP and a downstream corner position DHVP to be executed in the image reading apparatus 1 according to the embodiment of the present disclosure.

Figure 7:
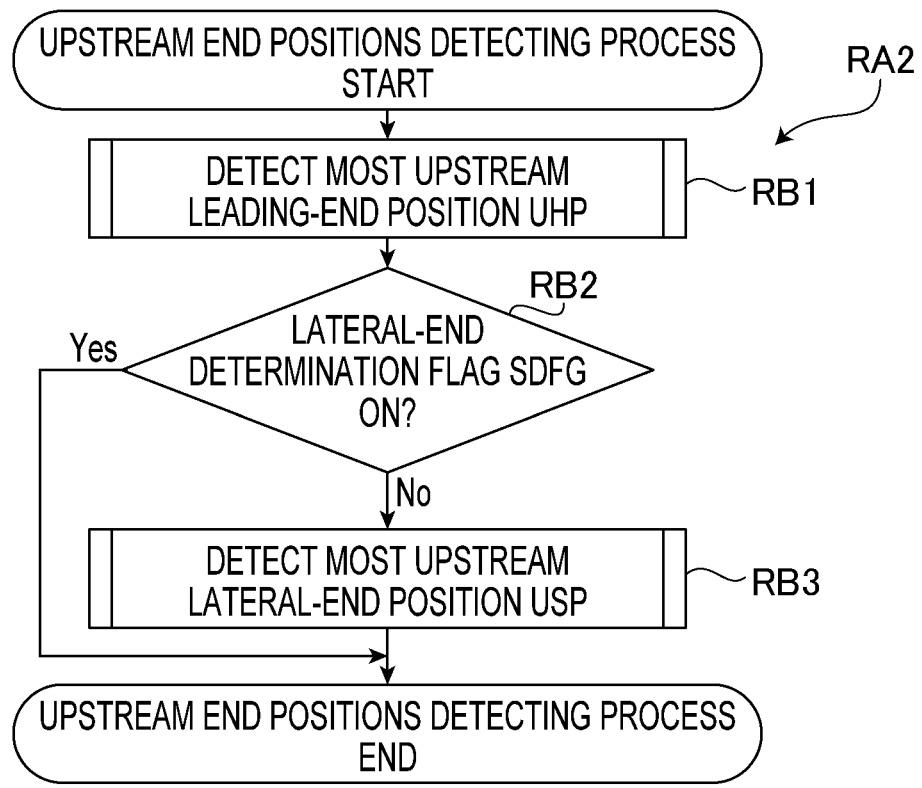

FIG. 7 is a flowchart to illustrate an upstream positions detecting process RA2 to be executed in the image reading apparatus 1 according to the embodiment of the present disclosure.

Figure 8:
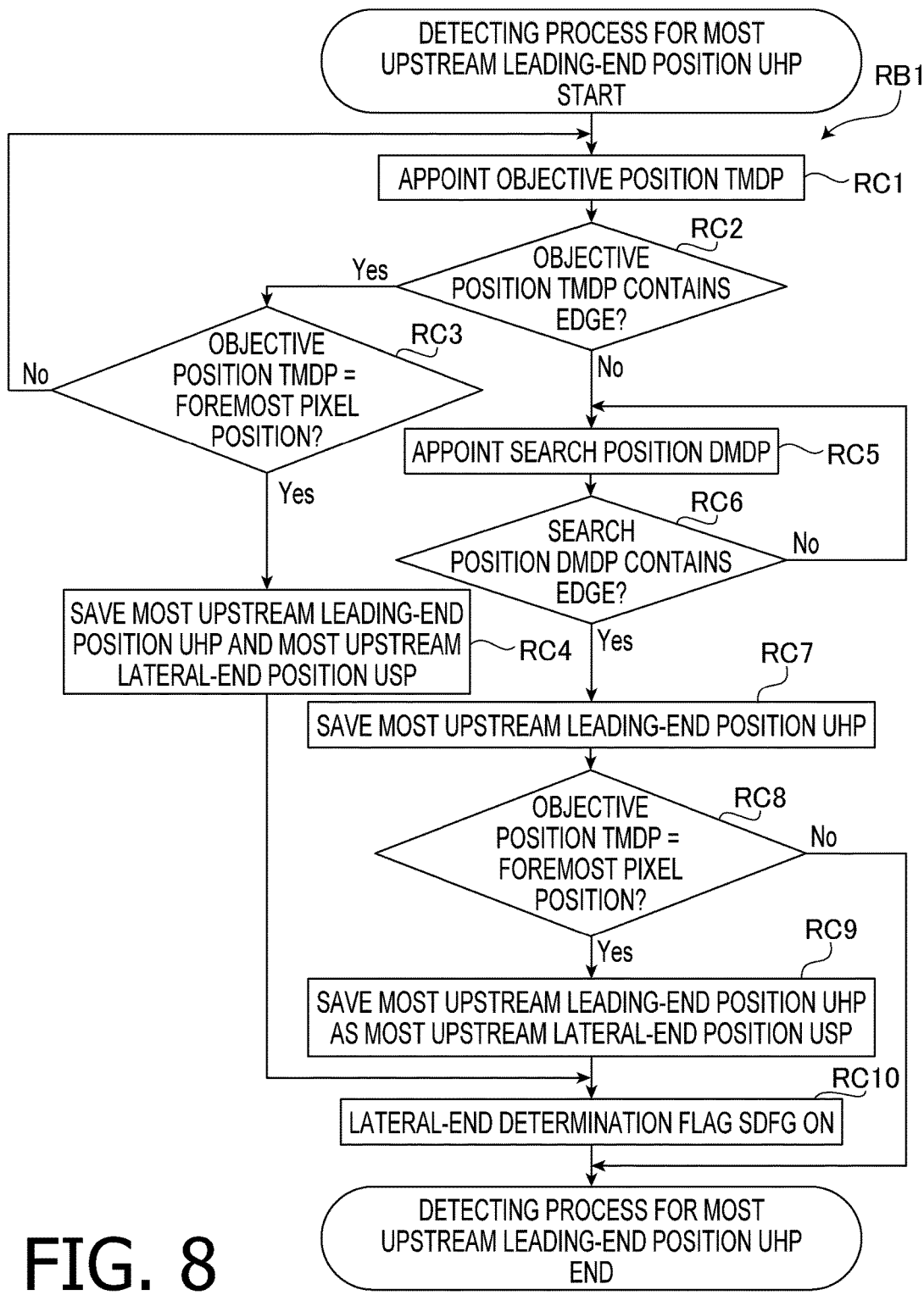

FIG. 8 is a flowchart to illustrate a most upstream leading-end position detecting process RB1 to detect a most upstream leading-end position UHP in the image reading apparatus 1 according to the embodiment of the present disclosure.

Figure 9:
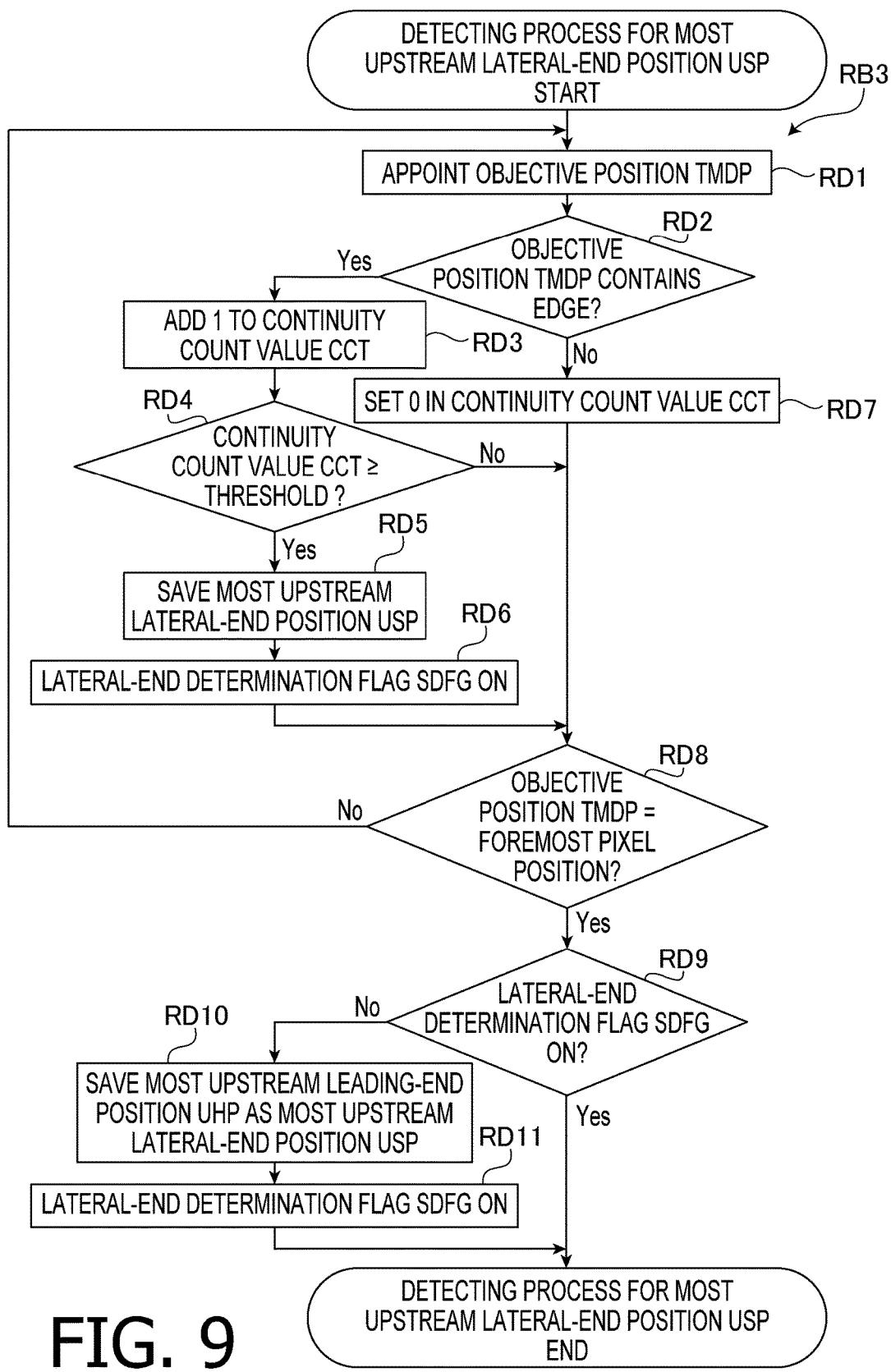

FIG. 9 is a flowchart to illustrate a most upstream lateral-end position detecting process RB3 to detect a most upstream lateral-end position USP in the image reading apparatus 1 according to the embodiment of the present disclosure.

Figure 10:
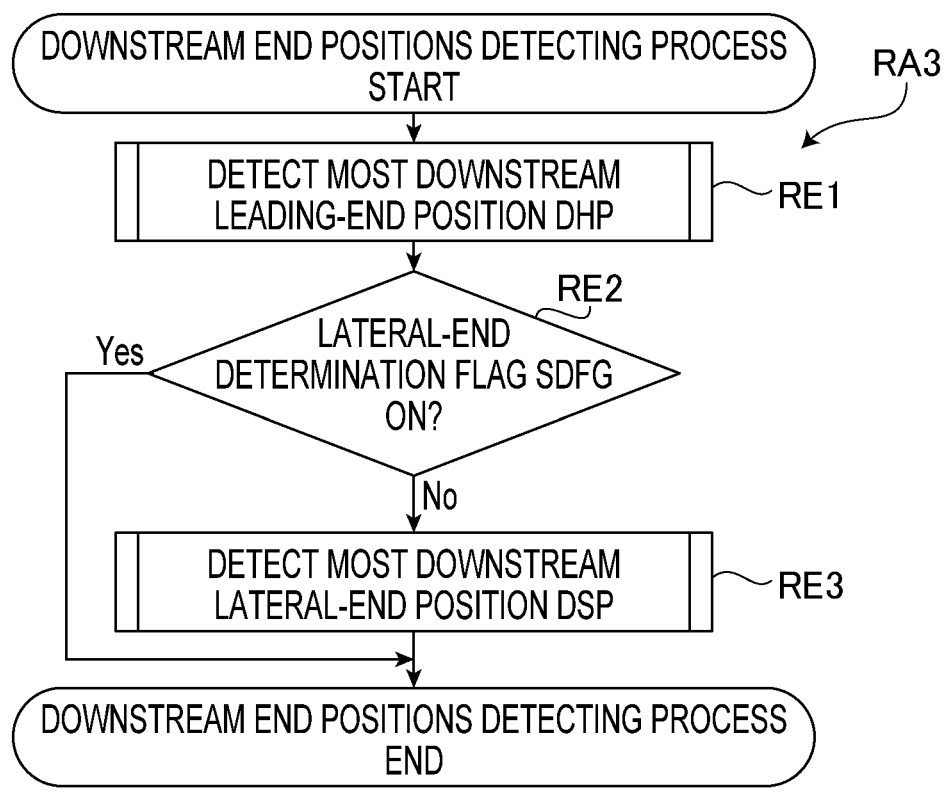

FIG. 10 is a flowchart to illustrate a downstream positions detecting process RA3 to be executed in the image reading apparatus 1 according to the embodiment of the present disclosure.

Figure 11:
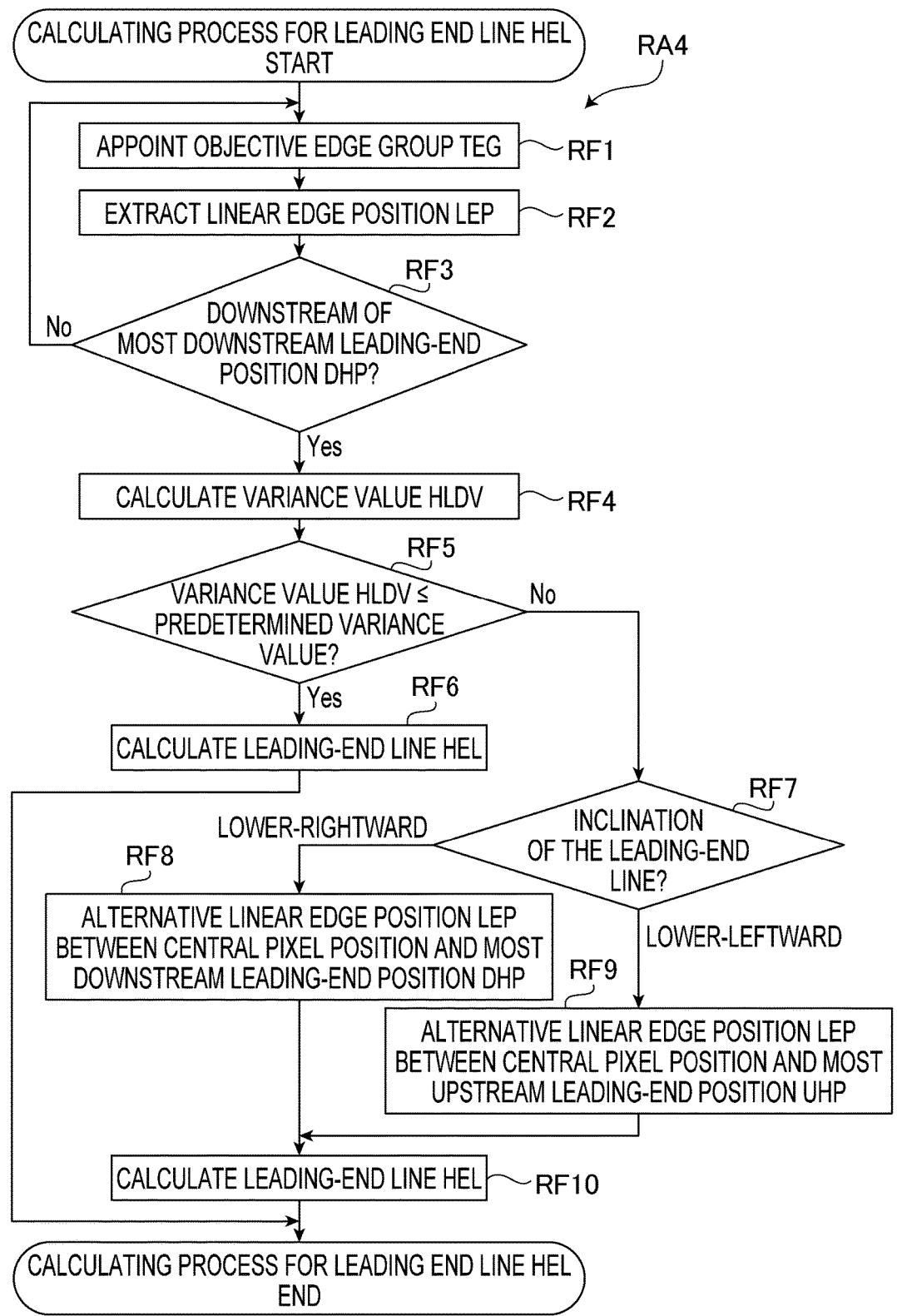

FIG. 11 is a flowchart to illustrate a leading-end line calculating process RA4 to calculate a leading-end line HEL in the image reading apparatus 1 according to the embodiment of the present disclosure.

Figure 12B:
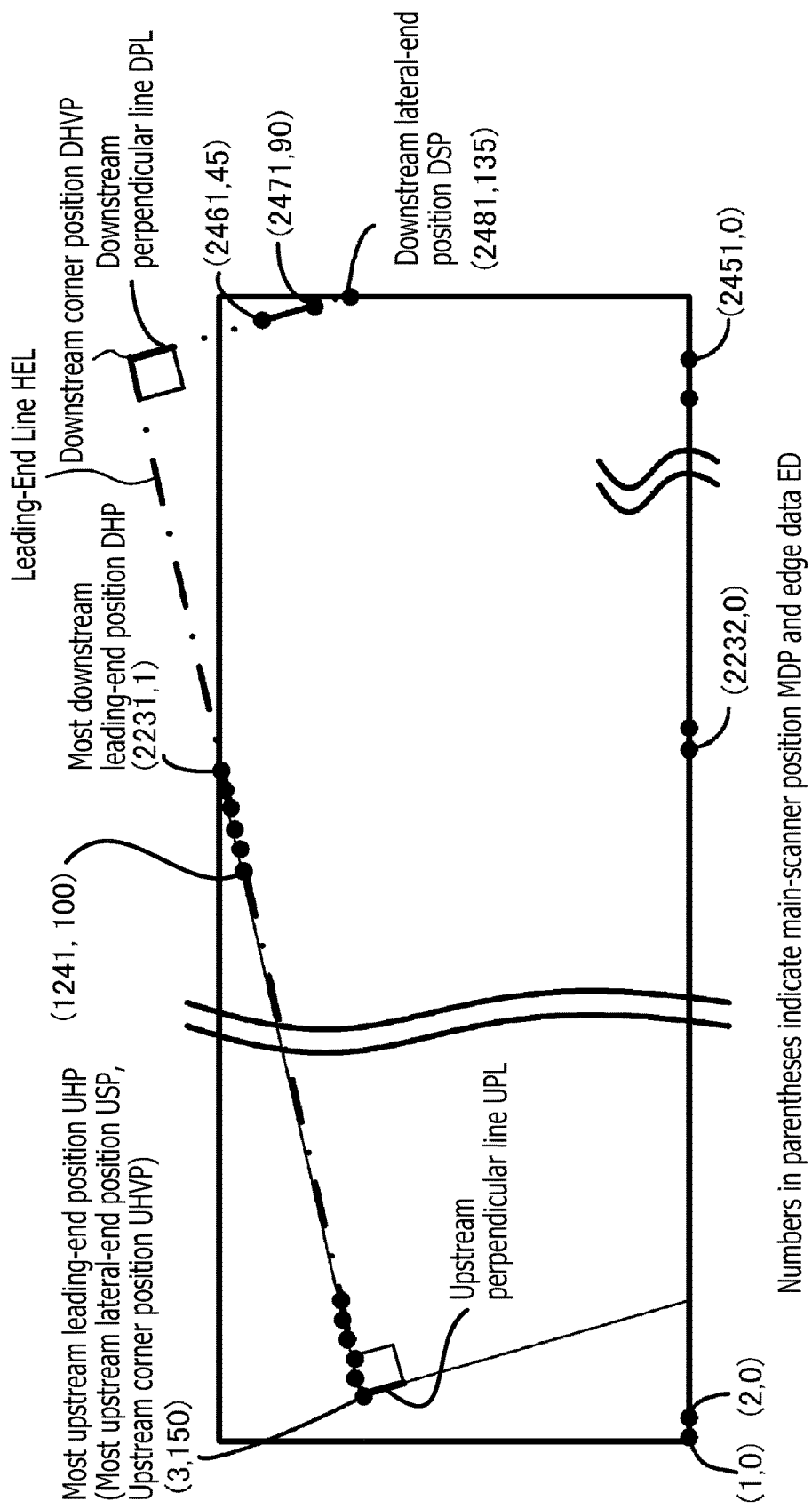

FIG. 12A is a table to illustrate data arrangement in the RAM 42 storing main-scanning positions MDP and edge data ED in the image reading apparatus 1 according to the embodiment of the present disclosure. FIG. 12B illustrates the main-scanning positions MDP and edge positions in an original sheet GS to be read in the image reading apparatus 1 according to the embodiment of the present disclosure.

Figure 13:
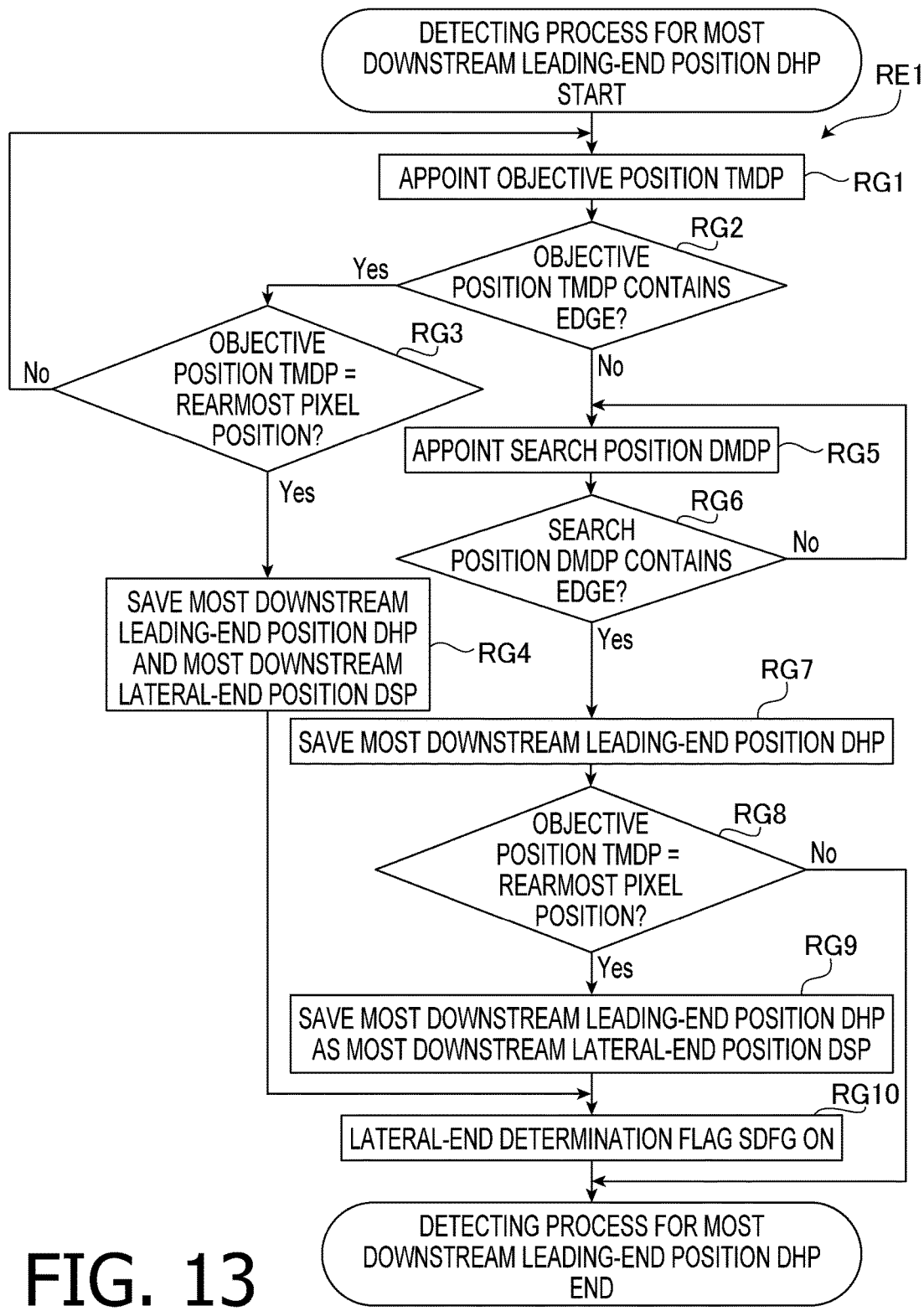

FIG. 13 is a flowchart to illustrate a most downstream leading-end position detecting process RE1 to detect a most downstream leading-end position DHP in the image reading apparatus 1 according to the embodiment of the present disclosure.

Figure 14:
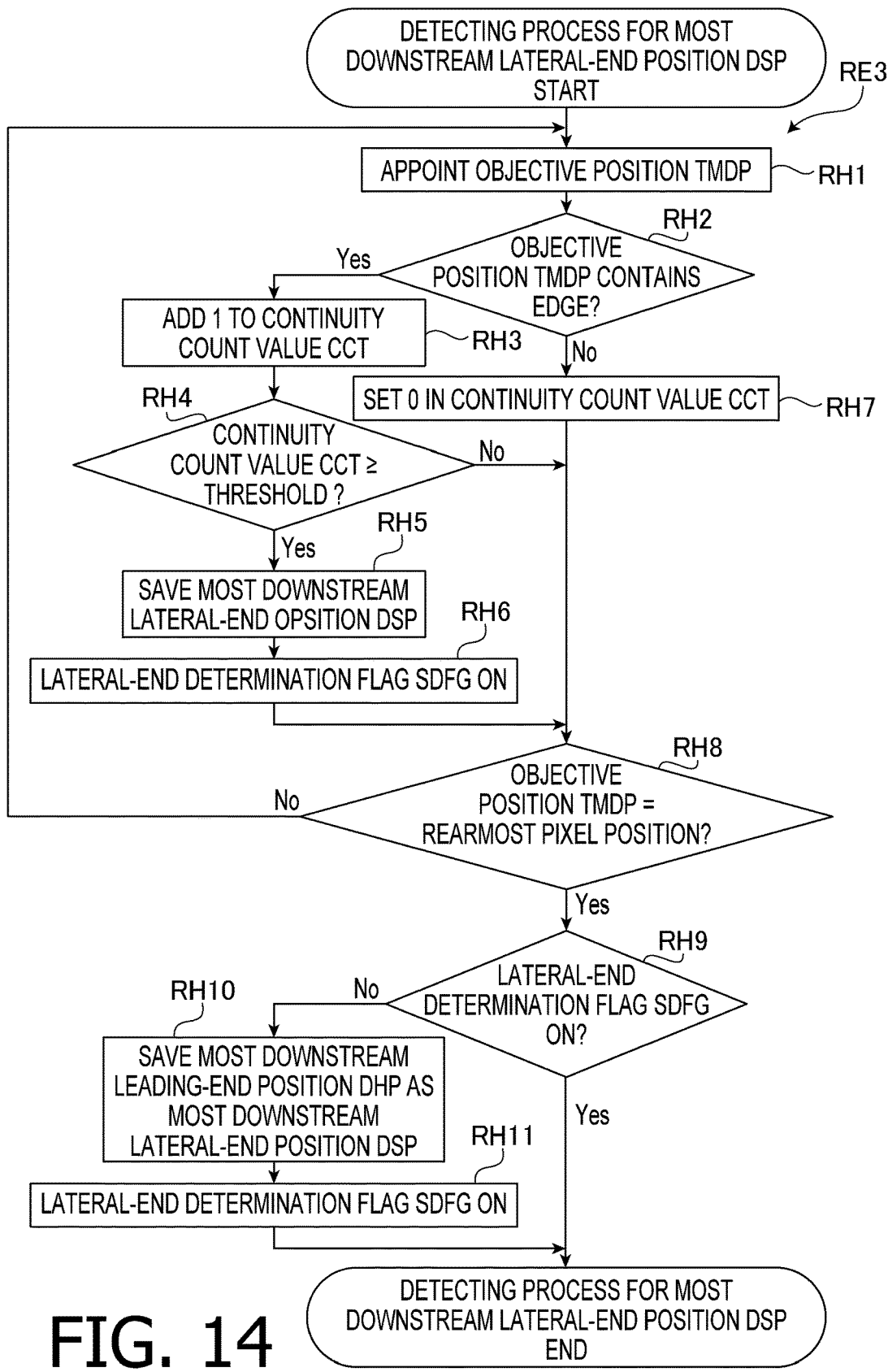

FIG. 14 is a flowchart to illustrate a most downstream lateral-end position detecting process RE3 to detect a most downstream lateral-end position DSP in the image reading apparatus 1 according to the embodiment of the present disclosure.

DETAILED DESCRIPTION

<Mechanical Configuration of Image Reading Apparatus 1>

Hereinafter, an exemplary configuration of an image reading apparatus 1 according to the embodiment of the present invention will be described with reference to the accompanying drawings. In the following description, orientation of items and parts in the image reading apparatus 1 will be referred to according to arrows, which indicate up, down, front, and rear, shown in FIG. 1. A conveying direction FD, along which an original sheet GS may be conveyed, is indicated by an arrow with a reference sign FD shown in FIGS. 1 and 2. A main-scanning direction MD, along which the original sheet GS may be scanned by an image reader 24, is indicated by an arrow with a reference sign MD shown in FIG. 3.

Figure 1:
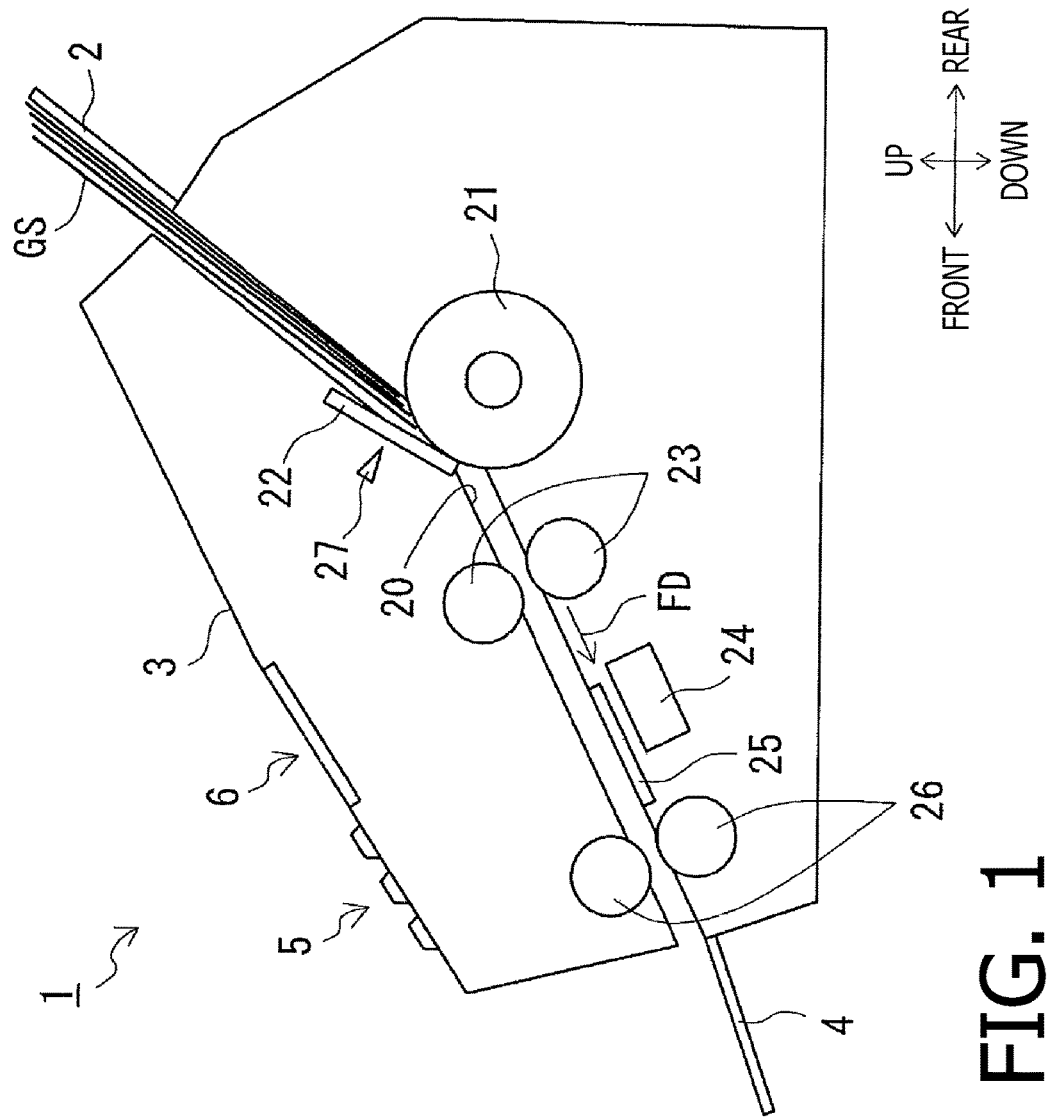
FIG. 1 is an illustrative view of an internal configuration of an image reading apparatus 1 according to an embodiment of the present disclosure.

The image reading apparatus 1 includes, as shown in FIG. 1, a feeder tray 2, a main body 3, and an ejection tray 4. Further, an operation interface 5 and a display 6 are arranged on an upper face of the main body 3. The operation interface 5 may include a power switch and buttons (unsigned), through which operating commands from a user may be entered. The operation interface 5 may include, for example, a start button to command the image reading apparatus 1 to start a reading action. The display 6 may include, for example, a liquid crystal display, to display a setting or a condition in the image reading apparatus 1. An original sheet GS may be placed on the feeder tray 2, in such an arrangement that a center of the original sheet GS in the main-scanning direction MD coincides with a central position on a supporting surface of the feeder tray 2 in the main-scanning direction MD. In other words, the feeder tray 2 may support the original sheet at a position on the supporting surface with reference to the central position, which is located at a center of the supporting surface in the main-scanning direction MD.

A conveyer path 20 is formed inside the main body 3. The original sheet GS supported by the feeder tray 2 may be conveyed along the conveyer path 20 in the conveying direction FD to be ejected outside the main body 3 at the ejection tray 4. Along the conveyer path 20, arranged are a feeder roller 21, a separator pad 22, a pair of upstream conveyer rollers 23, the image reader 24, a platen glass 23, and a pair of downstream conveyer rollers 26.

The feeder roller 21 may work in conjunction with the separator pad 22 to feed a plurality of original sheets GS serially one by one to the image reader 24. The feeder roller 21, the upstream conveyer rollers 23, and the downstream conveyer rollers 26 are driven by a conveyer motor MT (see FIG. 4). The platen glass 25 is light-transmissible and is disposed at a lower position with respect to the conveyer path 20 along the conveyer path 20. The upstream and downstream conveyer rollers 23, 26 are disposed at a central position in the main-scanning direction MD in the conveyer path 20 and may convey the original sheets GS fed by the feeder roller 21 over the platen glass 25 at a predetermined interval.

The original sheets GS may be placed on the feeder tray 2 in such an arrangement that an object surface of the original sheet GS to be read may face the supporting surface of the feeder tray 2. The image reader 24 is disposed at a lower position with respect to the conveyer path 20 and may read an image on the object surface of the original sheet GS as the original sheet GS is conveyed over the platen glass 25. In the feeder tray 2, disposed is a sheet sensor 27, which may be switched on when the feeder tray 2 supports the original sheets GS and switched off when no original sheet GS is placed on the feeder tray 2.

<Detailed Configuration of Image Reader 24>

Figure 2:
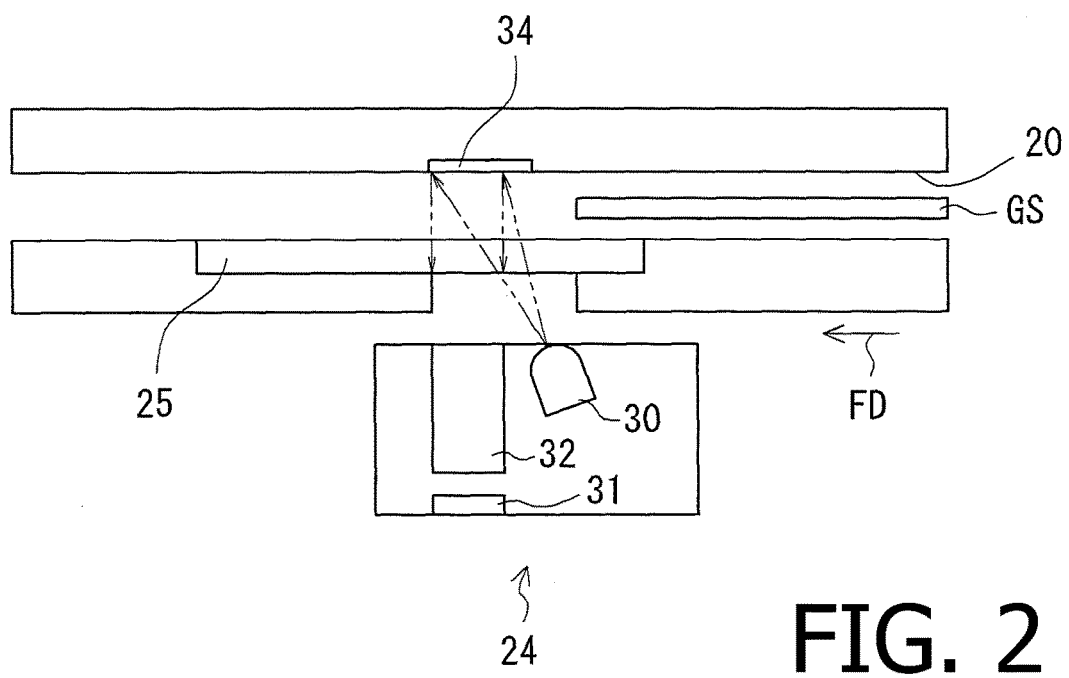
FIG. 2 is an illustrative view of an image reader 24 in the image reading apparatus 1 according to the embodiment of the present disclosure.

Detailed configuration of the image reader 24 will be described below with reference to FIGS. 2 and 3. As shown in FIG. 2, the image reader 24 includes a light source 30, a light receiver 31, and a rod lens array 32. The light source 30 includes light emitting diodes to emit light in three colors, which are red, green, and blue. Light emitted from the light source 30 may reflect on the object surface of the original sheet GS facing the image reader 24, and the rod lens array 32 may focus the reflected light on the light receiver 31. The light emitting diodes may be switched to emit light in the three colors consecutively to read a line of image extending in the main-scanning direction MD on the original sheet GS. The light source 30 includes a chip of light emitting diodes in the three colors and a light guide to guide the light from the light emitting diodes in the main-scanning direction MD.

A white reference board 34 is disposed at a position to face the image reader 24 across the conveyer path 20. The white reference board 34 has a same reflection rate as white, which is a base color of the original sheet GS. When no original sheet GS is in the conveyer path 20 between the white reference board 34 and the image reader 24, the light from the light source 30 may reflect on the white reference board 34, and the reflected light may be received by the light receiver 31 through the rod lens array 32.

As shown in FIG. 3, the light receiver 31 includes 12 sensor IC chips CH1-CH12, which align in line along the main-scanning direction MD, and an analog shift register, which is not shown. In the following description, the 12 sensor IC chips CH1-CH12 may also be called as the chips CH1-CH12. The chips CH1-CH12 include 2481 photoelectric converting devices 33 in total, which are arranged in line along the main-scanning direction MD. Each photoelectric converting device 33 may accumulate electric charges corresponding to an amount of the light received therein and output the electric charges to the analog shift register in a form of electric signals representing the light in a pixel. The analog shift register may accumulate the electric signals for each of a plurality of pixels, of which quantity is the same as a quantity of the photoelectric converting devices 33, i.e., 2481. Each of the photoelectric converting devices 33 is connected with one of registers in the analog shift register. The electric signals output from the analog shift register may be output to an analog front-end (AFE) 45 (see FIG. 4) through an amplifier, which is not shown, in a form of analog signals.

Among the 2481 photoelectric converting devices 33, one of the photoelectric converting devices 33 at one end in the chip CH1, which is at a most upstream position in the main-scanning direction MD, on a side to adjoin none of the chip CH2 or other chips CH3-CH12 may be called as a foremost photoelectric converting device 33. Another one of the photoelectric converting devices 33 at one end in the chip CH12, which is at a most downstream position in the main-scanning direction MD, on a side to adjoin none of the chip CH11 or other chips CH1-CH10 may be called as a rearmost photoelectric converting device 33. In this regard, among the 2481 pixels obtained through the 2481 photoelectric converting devices 33, a pixel obtained through the foremost photoelectric converting device 33 may be called as a foremost pixel, and another pixel obtained through the rearmost photoelectric converting device 33 may be called as a rearmost pixel. In this regard, the terms "foremost" and "rearmost" may not necessarily be related to the frontward direction and the rearward direction concerning the orientation of the image reading apparatus 1 indicated by arrows in FIG. 1. Meanwhile, another one of the photoelectric converting devices 33 in the chip CH7 at a center in the main-scanning direction MD, i.e., the 1241th pixel from the foremost photoelectric converting device 33 and from the rearmost photoelectric converting device 33, may be called as a central photoelectric converting device 33, and a pixel obtained through the central photoelectric converting device 33, which is at a position to face a central position in the main-scanning direction MD on the supporting surface of the sheet tray 2, may be called as a central pixel. In this regard, the 2481 photoelectric converting devices 33 may read a line of image extending along the main-scanning direction MD and obtain a group of 2481 pixels aligning in line along the main-scanning direction MD between the foremost pixel and the rearmost pixel inclusive at a time. Further, the 2481 photoelectric converting devices 33 may obtain a plurality of lines, each containing a group of 2481 pixels, arranged along the conveying direction FD line by line consecutively. In the following description, a main-scanning position MDP, which is a position of the pixels aligning in the main-scanning direction MD, may be expressed by a number, which corresponds to a number of the photoelectric converting device 33 that may read one of the 2481 images as the original sheet GS is conveyed in the conveying direction FD. For example, a main-scanning position MDP being a pixel position for the foremost pixels is expressed by 1; a main-scanning position MDP being a pixel position for the central pixels is expressed by 1241, and a main-scanning position MDP being a pixel position for the rearmost pixels is expressed by 2481.

<Electrical Configuration of Image Reading Apparatus 1>

The electrical configuration of the image reading apparatus 1 will be described below with reference to FIG. 4. As shown in FIG. 4, the image reading apparatus 1 includes a CPU 40, a ROM 41, a RAM 42, a flash ROM 43, a device controller 44, an analog front-end (AFE) 45, an image processor 46, an edge-position detector 49, and a driving circuit 47, which are mutually connected with the operation interface 5, the display 6, and the original sensor 27 through a bus 48.

The ROM 41 stores programs to be run to conduct operations, actions, and processes in the image reading apparatus 1, such as a main reading process (see FIG. 5) and subroutines in the main reading process, which will be described later in detail. The CPU 40 may control the operations in the image reading apparatus 1 according to the programs called from the ROM 41. The flash ROM 43 is a rewritable non-volatile memory to save data, which may be set to control the devices in the image reading apparatus 1 by the CPU 40, such as initialization data to be used when the devices in the image reading apparatus 1 are initialized. The RAM 42 may temporarily save results of computations generated by the CPU 40.

The device controller 44 is connected with the image reader 24 and may transmit signals to the light source 30 in accordance with instructions from the CPU 40 to control switching on and off the light source 30 and to control values of a current flowing into the light source 30. The device controller 44 may, as shown in FIG. 3, transmit serial-in signals SI, which are signals to the light receiver 31 to transmit the electrical signals from the photoelectric converting devices 33 in the chips CH1-CH12 to the registers in the analog shift register simultaneously, and clock signals CLK, which are signals to the light receiver 31 to output the electric signals in the analog shift register sequentially on a pixel basis, in accordance with instructions from the CPU 40. The image reader 24 receiving the signals from the device controller 44 may switch the light source 30 on and transmit analog signals in accordance with the amount of the light received in the light receiver 31 to the AFE 45.

The AFE 45 is connected with the image reader 24 and may convert the analog signals transmitted from the image reader 24 into digital data in accordance with instructions from the CPU 40. The AFE 45 has a predetermined extent of input range and resolution capability. For example, the resolution capability may be a scale between 0 and 1023 in 10 bits. In this case, the AFE 45 may convert the analog signals transmitted from the image reader 24 into 10-bit (0-1023) scaled digital data. The AFE 45 may transmit the converted digital data to the image processor 46 and the edge-position detector 49.

The image processor 46 includes an ASIC, which is an IC dedicated to image processing, to apply imaging processes to digital data. The imaging processes may include a correcting process, such as gamma correction. The image processor 46 may apply the imaging processes to the digital data to generate digital image data. The digital image data generated in the image processor 46 may be saved in the RAM 42 through the bus 48.

The edge-position detector 49 may search through a range in the digital image data along the conveying direction FD between a most upstream line, which is a first line to be read, and a 500th line inclusive in digital data pixel by pixel for edges of an original sheet GS in a method, for example, disclosed in U.S. Pat. No. 9,479,661 B2. When edges are detected in some of the pixels, the edge-position detector 49 may save edge data ED associated with the main-scanning positions MDP of the pixels in the RAM 42. More specifically, the edge-position detector 49 may search for an edge in each main-scanning position MDP, i.e., in each row of the pixels aligning along the conveying direction FD in the range between the most upstream line and the 500th line, and when an edge is detected for the first time in the row at the main-scanning position MDP, the edge-position detector 49 may save an edge position EP, indicating the position of the pixel containing the first-detected edge, as edge data ED in the RAM 42. Meanwhile, if no edge is detected at the main-scanning position MDP, i.e., in the row of the pixels aligning along the conveying direction FD between the most upstream line and the 500th line, the edge-position detector 49 may save a value "0," which indicates "edge absence" or "no edge NE" as the edge data ED in association with the main-scanning position MDP in the RAM 42. The edge position EP may mean a position of a pixel, at which a color in the pixel indicated in the digital data shifted from white to black along the conveying direction FD. For example, as shown in FIG. 12A, when an edge is detected for the first time at the 160th line in the row at the main-scanning position "3," the edge-position detector 49 may save a value "3" as the main-scanning position MDP and a value "160" as the edge data ED in the RAM 42. Meanwhile, when no edge is detected at the position of the foremost pixels, the edge-position detector 49 may save values "1" as the main-scanning position MDP and "0" indicating the absence of the edge or "no edge NE" as the edge data ED in the RAM 42.

The driving circuit 47 is connected with the conveyer motor MT and may drive the conveyer motor MT in accordance with driving instructions transmitted from the CPU 40. The driving circuit 47 may manipulate the conveyer motor MT to rotate in accordance with a rotation amount and a rotating direction indicated in the driving instructions. As the conveyer motor MT rotates for a predetermined amount, the feeder roller 21 and the upstream and downstream conveyer rollers 23, 26 may rotate in a predetermined rotation angle so that the original sheet GS may be conveyed in the conveyer path 20 for a predetermined distance.

<Actions in Image Reading Apparatus 1>

In the following paragraphs, described will be actions to be processed in the image reading apparatus 1. The image reading apparatus 1 may conduct a main reading process to read an image of the original sheet GS. Routines R1-R5 and subroutines in the main reading process may be executed by the CPU 40.

[Main Reading Process]

The main reading process shown in FIG. 5 may start when the user sets the original sheet GS in the feeder tray 2 and presses a read-start button (not shown) in the operation interface 5. In other words, the CPU 40 may start the main reading process in response to receipt of a read-start command from the operation interface 5 while the sheet sensor 27 is active.

In R1, the CPU 40 initializes the device controller 44, the AFE 45, the image processor 46, and the edge-position detector 49. In particular, the CPU 40 may set a resolution value "300 dpi" for the main-scanning direction MD and a configuration value required in a reading action in R2-R5 to read the image in a resolution of 300 dpi for the conveying direction FD to the device controller 44, the AFE 45, the image processor 46, and the edge-position detector 49. Further, the CPU 40 sets a value "0" as a continuity count value CCT.

In R2, the CPU 40 starts the reading action and conveys the original sheet GS. In particular, the CPU 40 may transmit a driving instruction to the driving circuit 47, and when the original sheet GS is conveyed to a read-start position, the CPU 40 may start the reading action. The read-start position may be a position, which is apart upstream along the conveying direction FD from a position, where a leading end of the original sheet GS may face the image reader 24, for 8.5 mm. In other words, while the original sheet GS is being conveyed to the read-start position, the CPU 40 may manipulate the image reader 24 to start reading an image. The image reader 24 may read a plain white image of the white reference board 34 until the original sheet GS is conveyed to the position to face the image reader 24. In other words, the image reader 24 may read the white reference board 34 while the original sheet GS travels downstream in the conveying direction FD for 8.5 mm, and as soon as the original sheet GS reaches the position to face the image reader 24, the image reader 24 may start reading the image of the original sheet GS. The original sheet GS is conveyed in the conveying path 20 in a central area in the main-scanning direction MD; therefore, at the central area in the main-scanning direction MD in the conveyer path 20, the image reader 24 may start reading before the leading end of the original sheet GS reaches the central position to face the image reader 24. In this regard, however, when the original sheet GS skews in the conveyer path 20, an off-centered part of the leading end of the original sheet GS apart from the central position in the main-scanning direction MD may proceed earlier than a central part of the leading end of the original sheet GS, and the image reader 24 may start reading the original sheet GS after the off-centered part of the leading end of the original sheet GS passes through the position to face the image reader 24. During the reading action, the CPU 40 manipulates the image processor 46 to store the digital image data in the RAM 42 and the edge-position detector 49 to store the main-scanning positions MDP and the edge positions EP in the RAM 42. In the present embodiment, the read-start position is apart upstream from the position where the leading end of the original sheet GS may face the image reader 24 for 8.5 mm along the conveying direction FD; therefore the leading end of the original sheet GS may coincide with the 100th line to be read by the image reader 24, if the original GS is conveyed without skewing.

In R3, the CPU 40 calculates an upstream corner position UHVP and a downstream corner position DHVP. The upstream corner position UHVP and the downstream corner position DHVP, which will be described later more in detail, will be described briefly in this paragraph (see also FIG. 12B). The CPU 40 may detect a most upstream leading-end position UHP, a most upstream lateral-end position USP, a most downstream leading-end position DHP, and a most downstream lateral-end position DSP of the original sheet SP. Between the most upstream leading-end position UHP and the most downstream leading-end position DHP, the CPU 40 may extract a linear edge position LEP and calculate a leading-end line HEL based on the extracted linear edge position LEP. The CPU 40 may save a position of an intersection between an upstream perpendicular line UPL and the leading-end line HEL in the RAM 42 as the upstream corner position UHVP. The upstream perpendicular line UPL is a line extending through the most upstream lateral-end position USP and intersecting orthogonally with the leading-end line HEL. Further, the CPU 40 may save a position of an intersection between a downstream perpendicular line DPL and the leading-end line HEL in the RAM 42 as the downstream corner position DHVP. The downstream perpendicular line DPL is a line extending through the most downstream lateral-end position DSP and intersecting orthogonally with the leading end line HEL.

In R4, the CPU 40 ends the reading action and ejects the original sheet GS at the ejection tray 4. In particular, the CPU 40 may end the reading action when the original sheet GS reaches a read-end position and transmit a driving instruction to the driving circuit 47 to eject the original sheet GS at the ejection tray 4. The read-end position may be a position, where a trailing end of the original sheet GS may face the image reader 24.

In R5, the CPU 40 corrects the digital image data in a correcting process. In particular, the CPU 40 may detect inclination of the leading-end line HEL and rotate the digital image data so that the leading-end line HEL representing the leading end of the original sheet GS may align with the main-scanning direction MD in the digital image data. The CPU 40 may calculate a distance between the upstream corner position UHVP and the downstream corner position DHVP to obtain a width of the original sheet GS in the main-scanning direction MD and trim the rotated digital image data at positions corresponding to the width of the original sheet GS centered at the position of the central pixel in the main-scanning direction MD. The CPU 40 may store the trimmed digital image data in the RAM 42. The main reading process may end at the end of R5.

[Calculating Process R3 for Upstream Corner Position UHVP and Downstream Corner Position DHVP]

The calculating process R3 to obtain the upstream corner position UHVP and the downstream corner position DHVP will be described in the following paragraphs with reference to FIG. 6. As the calculating process starts, in RA1, the CPU 40 obtains the edge position EP of the central pixel position. In particular, the CPU 40 may obtain the edge position EP at the main-scanning position MDP "1241," which is the position of the central pixels, i.e., the 1241th pixels.

In RA2, the CPU 40 conducts an upstream positions detecting process, in which the CPU 40 detects the most upstream leading-end position UHP and the most upstream lateral-end position USP. The upstream position detecting process will be described more in detail later.

In RA3, the CPU 40 conducts a downstream positions detecting process, in which the CPU 40 detects the most downstream leading-end position DHP and the most downstream lateral-end position DSP. The downstream positions detecting process will be described more in detail later.

In RA4, the CPU 40 calculates the leading-end line HEL. The CPU 40 may extract the linear edge position LEP from the edge positions EP of the pixels between the most upstream leading-end position UHP and the most downstream leading-end position DHP and calculate the leading-end line HEL based on the extracted linear edge position LEP (see FIG. 12B). The leading-end line HEL is indicated in a dash-and-dot line in FIG. 12B. The process to calculate the leading-end line HEL will be described more in detail later.

In RA5, the CPU 40 calculates the upstream corner position UHVP. In particular, the CPU 40 may calculate the upstream perpendicular line UPL, which extends through the most upstream lateral-end position USP and intersects orthogonally with the leading-end line HEL. The CPU 40 saves the position of the intersection between the upstream perpendicular line UPL and the leading-end line HEL as the upstream corner position UHVP in the RAM 42.

In RA6, the CPU calculates the downstream corner position DHVP. In particular, the CPU 40 may calculate the downstream perpendicular line DPL, which extends through the most downstream lateral-end position DSP and intersects orthogonally with the leading-end line HEL. The CPU 40 saves the position of the intersection between the downstream perpendicular line DPL and the leading-end line HEL as the downstream corner position DHVP in the RAM 42. The calculating process R3 to obtain the upstream corner position UHVP and the downstream corner position DHVP may end at the end of RA6. The downstream perpendicular line DPL is indicated in a dash-and-double-dots line in FIG. 12B.

[Upstream Positions Detecting Process RA2]

In the upstream positions detecting process RA2, the CPU 40 detects the most upstream leading-end position UHP in RB1. The process in RB1, which will be described later in detail, will be described briefly in this paragraph. As the upstream positions detecting process RA2 starts, in RB1, the CPU 40 detects the most upstream leading-end position UHP. In particular, the CPU 40 may first appoint the central pixel position as an objective position TMDP and search for an edge of the original sheet GS in row at the objective position TMDP. The CPU 40 may shift the objective position TMDP upstream along the main-scanning direction MD consecutively to detect edges of the original sheet GS until no edge is detected in the objective position TMDP. When the CPU 40 searches through the objective positions TMDP upstream in the main-scanning direction MD and finds no more edge in the objective positions TMDP, the CPU 40 may appoint the objective position TMDP, in which the edge was absent in the row for the first time, as a search position DMDP. From the firstly appointed search position DMDP, the CPU 40 may shift the search position DMDP sequentially downstream along the main-scanning direction MD until an edge is detected in the search position DMDP. When an edge is detected in one of the search positions DMDP, the CPU 40 may save the search position DMDP in which the edge was detected as the most upstream leading-end position UHP in the RAM 42. The CPU 40 may examine whether the objective position TMDP coincides with the foremost pixel position, and if the CPU 40 determines that the objective position TMDP coincides with the foremost pixel position, the CPU 40 may save the most upstream leading-end position UHP as the most upstream lateral-end position USP in the RAM 42 and set a lateral-end determination flag SDFG on.

In RB2, the CPU 40 determines whether the lateral-end determination flag SDFG is on. If the CPU 40 determines that the lateral-end determination flag SDFG is on (RB2: YES), the CPU 40 ends the upstream positions detecting process RA2. If the CPU 40 determines that the lateral-end determination flag SDFG is off (RB2: NO), the CPU 40 proceeds to RB3.

In RB3, the CPU 40 detects the most upstream lateral-end position USP in RB3. The process in RB3, which will be described in detail later, will be described briefly in this paragraph. The CPU 40 may appoint the pixel position appointed as the objective position TMDP in RB1 as the objective position TMDP and search for an edge of the original sheet GS in the new objective position TMDP. The CPU 40 may shift the objective position TMDP upstream along the main-scanning direction MD consecutively to detect edges of the original sheet GS row by row up to the foremost pixel position. When the CPU 40 detects an edge in the objective position TMDP, the CPU 40 may add a value "1" to the continuity count value CCT. When the CPU 40 finds no edge in the objective position TMDP, the CPU 40 may set a value "0" in the continuity count value CCT. When the continuity count value CCT indicates "3" or a larger value, the CPU 40 may save the objective position TMDP as the most upstream lateral-end position USP in the RAM 42 and set the lateral-end determination flag SDFG on. The upstream positions detecting process RA2 ends at the end of RB3.

[Detecting Process RB1 for Most Upstream Leading-End Position UHP]

The most upstream leading-end position detecting process RB1 will be described in the following paragraphs with reference to FIG. 8. As the most upstream leading-end position detecting process RB1 starts, in RC1, the CPU 40 appoints a pixel position as the objective position TMDP. In particular, the CPU 40 may appoint the central pixel position as the objective position TMDP if no objective position TMDP is appointed yet in RB1. If any of the pixel positions is appointed already as the objective position TMDP in RB1, the CPU 40 may appoint a pixel position, which is apart upstream from the currently appointed objective position TMDP for a distance equivalent to a predetermined quantity of, e.g., 10, pixels along the main-scanning direction MD, as a new objective position TMDP. Generally, a dimension of an obstacle, such as paper dust, which may be erroneously detected as an edge, may be 0.8 mm or smaller. Meanwhile, the resolution of the image reader 24 in the main-scanning direction MD in the present embodiment is 300 dpi. In this regard, the sequentially appointed adjoining objective positions TMDP are apart from each other for a distance corresponding to 10 pixel; therefore, the objective positions TMDP may be appointed at each 0.85 mm. In other words, presence of an edge in the objective position TMDP may be examined at every 0.85 mm along the main-scanning direction MD so that the CPU 40 should avoid erroneously detecting the same obstacle twice consecutively as edges.

In RC2, the CPU 40 determines whether an edge is detected in the objective position TMDP. In particular, the CPU 40 may determine that no edge is detected in the objective position TMDP if the edge data ED at the objective position TMDP contains the value "0" (RC2: NO), which indicates edge absence or "no edge NE," and may proceed to RC5. On the other hand, if the edge data ED for the objective position TMDP contains a value other than "0" (RC2: YES), the CPU 40 may determine that an edge is detected in the objective position TMDP and proceed to RC3.

In RC3, the CPU 40 determines whether the objective position TMDP coincides with the foremost pixel position. If the objective position TMDP coincides with the foremost pixel position (RC3: YES), the CPU 40 proceeds to RC4. If the objective position TMDP does not coincide with the foremost pixel position (RC3: NO), the CPU 40 returns to RC1.

Following RC3, in RC4, the CPU 40 saves the most upstream leading-end position UHP and the most upstream lateral-end position USP. In particular, the CPU 40 may save the foremost pixel position in terms of the main-scanning direction MD and the edge position EP of the foremost pixel position in terms of the conveying direction FD both as the most upstream leading-end position UHP and as the most upstream lateral-end position USP in the RAM 42. After RC4, the CPU 40 proceeds to RC10.

In RC2, if the edge data ED for the objective position TMDP contains the value "0" (RC2: NO), in RC5, the CPU 40 appoints a pixel position as a search position DMDP. In particular, if no pixel position is appointed yet as the search position DMDP, the CPU 40 may appoint a pixel position, which adjoins the currently appointed objective position TMDP downstream along the main-scanning direction MD, as the search position DMDP. If any of the pixel positions is appointed already as the search position DMDP, the CPU 40 may appoint a pixel position, which adjoins the currently appointed search position DMDP downstream along the main-scanning direction MD, as a new search position DMDP.

In RC6, the CPU 40 determines whether an edge is detected in the search position DMDP. In particular, the CPU 40 may determine that no edge is detected in the search position DMDP if the edge data ED for the search position DMDP contains the value "0" (RC6: NO), which indicates edge absence or "no edge NE," and may proceed to RC5. On the other hand, if the edge data ED for the search position DMDP contains a value other than "0" (RC6: YES), the CPU 40 may determine that an edge is detected in the search position DMDP and proceed to RC7.

In RC7, the CPU 40 saves the most upstream leading-end position UHP. In particular, the CPU 40 may save the search position DMDP in terms of the main-scanning direction MD and the edge position EP of the search position DMD in terms of the conveying direction FD as the most upstream leading-end position UHP in the RAM 42.

In RC8, the CPU 40 determines whether the objective position TMDP coincides with the foremost pixel position. If the objective position TMDP coincides with the foremost pixel position (RC8: YES), the CPU 40 proceeds to RC9. If the objective position TMDP does not coincide with the foremost pixel position (RC8: NO), the CPU 40 ends the most upstream leading-end position detecting process RB1.

In RC9, the CPU 40 saves the most upstream leading-end position UHP as the most upstream lateral-end position USP in the RAM 42.

Following RC4 or RC9, in RC10, the CPU 40 sets the lateral-end determination flag SDFG on and saves the flag in the RAM 42. The most upstream leading-end position detecting process RB1 ends at the end of RC10.

[Detecting Process RB3 for Most Upstream Lateral-End Position USP]

The most upstream lateral-end position detecting process RB3 will be described in the following paragraphs with reference to FIG. 9. As the most upstream lateral-end position detecting process starts, in RD1, the CPU 40 appoints a new objective position TMDP. In particular, the CPU 40 may appoint a pixel position, which is apart upstream from the currently appointed objective position TMDP for the predetermined quantity of, e.g., 10, pixels along the main-scanning direction MD, as the new objective position TMDP. The currently appointed objective position TMDP may be one of the objective position TMDP appointed in RC1 and the objective position TMDP appointed in RB3.

In RD2, the CPU 40 determines whether an edge is detected in the objective position TMDP. In particular, the CPU 40 may determine that no edge is detected in the objective position TMDP if the edge data ED for the objective position TMDP contains the value "0" (RD2: NO), which indicates edge absence or "no edge NE," and may proceed to RC7. On the other hand, if the edge data ED for the objective position TMDP contains a value other than "0" (RD2: YES), the CPU 40 may determine that an edge is detected in the objective position TMDP and proceed to RD3.

In RD3, the CPU 40 adds a value "1" to the continuity count value CCT.

In RD4, the CPU 40 determines whether the continuity count value CCT indicates a value greater than or equal to a threshold value. If the continuity count value CCT indicates a value greater than or equal to the threshold value (RD4: YES), the CPU 40 proceeds to RD5. If the continuity count value CCT indicates a value smaller than the threshold value (RD4: NO), the CPU 40 proceeds to RD8. Thus, the CPU 40 may determine whether the CPU 40 should save the most upstream lateral-end position USP based on the continuity count value CCT. While the CPU 40 may erroneously detect an edge twice sequentially by, for example, misjudging an obstacle, e.g., paper dust, as an edge or erroneously detecting an edge due to, for example, noise, it may be unlikely that the CPU 40 erroneously detects an edge for three times sequentially. In this regard, in the present embodiment, the threshold value for the continuity count value CCT is "3."

In RD5, the CPU 40 saves the most upstream lateral-end position USP. In particular, the CPU 40 may save the objective position TMDP in terms of the main-scanning direction MD and the edge position EP of the objective position TMDP in terms of the conveying direction FD as the most upstream lateral-end position USP in the RAM 42.

In RD6, the CPU 40 sets the lateral-end determination flag SDFG on and saves the flag in the RAM 42.

In RD2, if the CPU 40 determines that no edge is detected in the objective position TMDP (RD2: NO), in RD7, the CPU 40 sets the continuity count value CCT at "0."

In RD4, if the continuity count value CCT indicates a value smaller than the threshold value (RD4: NO), or following one of RD6 and RD7, in RD8, the CPU 40 determines whether the objective position TMDP coincides with the foremost pixel position. If the objective position TMDP coincides with the foremost pixel position (RD8: YES), the CPU 40 proceeds to RD9. If the objective position TMDP does not coincide with the foremost pixel position (RD8: NO), the CPU 40 returns to RD1.

In RD9, the CPU 40 determines whether the lateral-end determination flag SDFG is on. If the CPU 40 determines that the lateral-end determination flag SDFG is on (RD9: YES), the CPU 40 ends the most upstream lateral-end position detecting process (RB3). If the CPU 40 determines that the lateral-end determination flag SDFG is off (RD9: NO), the CPU 40 proceeds to RD10.

In RD10, the CPU 40 saves the most upstream leading-end position UHP as the most upstream lateral-end position USP in the RAM 42.

In RD11, the CPU 40 sets the lateral-end determination flag SDFG on and saves the flag in the RAM 42. The most upstream lateral-end position detecting process RB3 ends at the end of RC11. The flow returns to the calculating process R3 to obtain the upstream corner position UHVP and the downstream corner position DHVP (see FIG. 6).

[Downstream Position Detecting Process RA3]

The downstream position detecting process RA3 will be described in the following paragraphs with reference to FIG. 10. As the downstream position detecting process RA3 starts, in RE1, the CPU 40 detects the most downstream leading-end position DHP in a most downstream leading-end position detecting process RE1 shown in FIG. 13. It may be noted that, while in RB1 the CPU 40 searched through the pixel positions upstream from the central pixel position along the main-scanning direction MD to detect the edges, in RE1, the CPU 40 searches through the pixel positions downstream from the central pixel position along the main-scanning direction MD to detect edges. Therefore, description of processes which are substantially similar to those in RB1 will be herein omitted. Specifically, processes in RG2, RG6, and RG10 are the same as those in RC2, RC6, and RC10, respectively; therefore, description of those will be omitted.

The most downstream leading-end position detecting process RE1 will be described in the following paragraphs with reference to FIG. 13. As the most downstream leading-end position detecting process RE1 starts, in RG1, the CPU 40 appoints a pixel position as an objective position TMDP. In particular, the CPU 40 may appoint the central pixel position as the objective position TMDP if no objective position TMDP is appointed yet in RE1. If any of the pixel positions is appointed already as the objective position TMDP in RE1, the CPU 40 may appoint a pixel position, which is apart downstream from the currently appointed objective position TMDP for the predetermined quantity of, e.g., 10, pixels along the main-scanning direction, as a new objective position TMDP.

In RG2, if the CPU 40 determines that an edge is detected in the objective position TMDP (RG2: YES), in RG3, the CPU 40 determines whether the objective position TMDP coincides with the rearmost pixel position. If the objective position TMDP coincides with the rearmost pixel position (RG3: YES), the CPU 40 proceeds to RG4. If the objective position TMDP does not coincide with the rearmost pixel position (RG3: NO), the CPU 40 returns to RG1.

Following RG3, in RG4, the CPU 40 saves the most downstream leading-end position DHP and the most downstream lateral-end position DSP. In particular, the CPU 40 may save the rearmost pixel position in terms of the main-scanning direction MD and the edge position EP of the rearmost pixel position in terms of the conveying direction FD both as the most downstream leading-end position DHP and the most downstream lateral-end position DSP in the RAM 42. After RG4, the CPU 40 proceeds to RG10.

In RG2, if the edge data ED for the objective position TMDP contains the value "0" (RG2: NO), in RG5, the CPU 40 appoints the search position DMDP. In particular, if no pixel position is appointed yet as the search position DMDP, the CPU 40 may appoint a pixel position, which adjoins the currently appointed objective position TMDP upstream along the main-scanning direction MD, as the search position DMDP. If any of the pixel positions is appointed already as the search position DMDP, the CPU 40 may appoint a pixel position, which adjoins the currently appointed search position DMDP upstream along the main-scanning direction MD, as a new search position DMDP.

In RG6, if the CPU 40 determines that an edge is detected in the search position DMDP (RG6: YES), in RG7, the CPU 40 saves the most downstream leading-end position DHP. In particular, the CPU 40 may save the search position DMDP in terms of the main-scanning direction MD and the edge position EP of the search position DMDP in terms of the conveying direction FD as the most downstream leading-end position DHP in the RAM 42.

In RG8, the CPU 40 determines whether the objective position TMDP coincides with the rearmost pixel position. If the objective position TMDP coincides with the rearmost pixel position (RG8: YES), the CPU 40 proceeds to RG9. If the objective position TMDP does not coincide with the rearmost pixel position (RG8: NO), the CPU 40 ends the most downstream leading-end position detecting process RE1.

In RG9, the CPU 40 saves the most downstream leading-end position DHP as the most downstream lateral-end position DSP in the RAM 42.

Following RG4 or RG9, in RG10, the CPU 40 sets the lateral-end determination flag SDFG on and saves the flag in the RAM 42. The most downstream leading-end position detecting process RE1 ends at the end of RG10. The flow returns to the downstream positions detecting process RA3 (see FIG. 10).

Following RE1, in RE2, as shown in FIG. 10, the CPU 40 determines whether the lateral-end determination flag SDFG is on. If the CPU 40 determines that the lateral-end determination flag SDFG is on (RE2: YES), the CPU 40 ends the downstream positions detecting process RA3. If the CPU 40 determines that the lateral-end determination flag SDFG is off (RE2: NO), the CPU 40 proceeds to RE3.

In RE3, the CPU 40 detects the most downstream lateral-end position DSP. It may be noted that, while in the most upstream lateral-end position detecting process RB3 the CPU 40 searched through the pixel positions upstream from the objective position TMDP appointed in RB1 along the main-scanning direction MD to detect the edges, in RE3, the CPU 40 searches through the pixel positions downstream from the objective position TMDP appointed in RE1 along the main-scanning direction MD for edges. Therefore, description of processes which are substantially similar to those in RB3 will be herein omitted. Specifically, processes in RH2, RH3, RH4, RH6, RH7, RH9, and RH11 are the same as those in RD2, RD3, RD4, RD6, RD7, RD9, and RD11, respectively; therefore, description of those will be omitted.

The most downstream lateral-end position detecting process RE3 will be described in the following paragraphs with reference to FIG. 14. As the most downstream lateral-end position detecting process starts, in RH1, the CPU 40 appoints a new objective position TMDP. In particular, the CPU 40 may appoint a pixel position, which is apart downstream from the currently appointed objective position TMDP for the predetermined quantity of, e.g., 10, pixels along the main-scanning direction MD, as the new objective position TMDP. The currently appointed objective position TMDP may be one of the objective position TMDP appointed in RE1 and the objective position TMDP appointed in RE3.

In RH4, the CPU 40 determines whether the continuity count value CCT indicates a value greater than or equal to a threshold value. If the continuity count value CCT indicates a value greater than or equal to the threshold value (RH4: YES), in RH5, the CPU 40 saves the most downstream lateral-end position DSP. In particular, the CPU 40 may save the objective position TMDP concerning the main-scanning direction MD and the edge position EP of the objective position TMDP concerning the conveying direction FD as the most downstream lateral-end position DSP in the RAM 42.

In RH4, if the continuity count value CCT indicates a value smaller than the threshold value (RH4: NO), or following one of RH6 and RH7, in RH8, the CPU 40 determines whether the objective position TMDP coincides with the rearmost pixel position. If the objective position TMDP coincides with the rearmost pixel position (RH8: YES), the CPU 40 proceeds to RH9. If the objective position TMDP does not coincide with the rearmost pixel position (RH8: NO), the CPU 40 returns to RH1.

In RH9, if the CPU 40 determines that the lateral-end determination flag SDFG is off (RH9: NO), in RH10, the CPU 40 saves the most downstream leading-end position DHP as the most downstream lateral-end position DSP in the RAM 42. If the CPU 40 determines that the lateral-end determination flag SDFG is on (RH9: YES), or following RH11, the CPU 40 ends the most downstream lateral-end position detecting process RE3. The most downstream lateral-end position detecting process RE3 ends at the end of RH11. At the end of RE3, ends the downstream positions detecting process RA3. The flow returns to the calculating process R3 to obtain the upstream corner position UHVP and the downstream corner position DHVP (see FIG. 6).

[Leading-End Line Calculating Process RA4]

The leading-end line calculating process RA4 will be described in the following paragraphs with reference to FIG. 11. As the leading-end line calculating process RA4 starts, in RF1, the CPU 40 appoints objective edges as an objective edge group TEG In particular, if no objective edge group TEG is appointed yet, the CPU 40 may appoint all of the main-scanning positions MDP and the edge positions EP, which are in the range along the conveying direction FD between the most upstream line and the 500th line, and in a range along the main-scanning direction MD between the most upstream leading-end position UHP and a pixel position apart downstream from the most upstream leading-end position UHP for a distance equivalent to a predetermined quantity of pixels, e.g., 11 pixels, as the objective edge group TEG If the objective edge group TEG is appointed already, the CPU 40 may appoint all of the main-scanning positions MDP and the edge positions EP among the pixel positions included in the range along the conveying direction FD between the most upstream line and the 500th line, and in a range along the main-scanning direction MD between a most downstream pixel position among the pixel positions included in the currently appointed objective edge group TEG and a pixel position apart downstream from the most downstream pixel position in the main-scanning direction MD for a distance equivalent to the predetermined quantity, e.g., 11, of pixels, as a new objective edge group TEG. The predetermined quantity of pixels, which defines the range of the objective edge group TEG along the main-scanning direction MD, should be an odd number approximate to 10, which may be 11. Therefore, within the range along the conveying direction FD between the most upstream line and the 500th line and in the range along the main-scanning direction MD within the distance equivalent to 11 pixels, 11 pixel positions, i.e., 11 main-scanning positions MDP and 11 edge positions EP, are appointed as the objective edge group TEG In RF2, the CPU 40 extracts the linear edge position LEP. In particular, the CPU 40 may hypothetically arrange the 11 edge positions EP in the objective edge group TEG sequentially in the order along the conveying direction FD from upstream to downstream, and extract the main-scanning position MDP and the edge position EP of the pixel position at a center within the sequentially arranged 11 edge positions EP and the main-scanning position MDP associated with the edge position EP as the linear edge position LEP. Thus, with the linear edge position LEP being based the pixel position of the edge position EP at the center within the objective edge group TEG even when some of the edge positions EP are misjudged due to, for example, imaging noise, the linear edge position LEP may be extracted substantially accurately based on the centricity among the 11 edge positions.

In RF3, the CPU 40 determines whether a pixel position, which is apart downstream for the predetermined quantity of, e.g., 11, pixels from a most downstream pixel position in the main-scanning direction MD among the pixel positions contained in the current objective edge group TEG is located downstream along the main-scanning direction MD from the most downstream leading-end position DHP. If the pixel position, which is apart downstream for 11 pixels from the most downstream pixel position in the main-scanning direction MD among the pixel positions contained in the current objective edge group TEG is located downstream along the main-scanning direction MD from the most downstream leading-end position DHP (RF3: YES), the CPU 40 proceeds to RF4. If the pixel position, which is apart downstream for 11 pixels from the most downstream pixel position in the main-scanning direction MD among the pixel positions contained in the current objective edge group TEG is not located downstream along the main-scanning direction MD from the most downstream leading-end position DHP (RF3: NO), the CPU 40 returns to RF 1.

In RF4, the CPU 40 calculates a variance value HLDV based on the linear edge positions LEP. In particular, the CPU 40 may repeat RF1-RF3 to extract every liner edge position LEP in the range and calculates inclination of each line between adjoining two pixel positions within the extracted linear edge positions LEP, and a sample variance value in the calculated inclinations may be obtained as the variance value HLDV.

In RF5, the CPU 40 determines whether the variance value HLDV calculated in RF4 is smaller than or equal to a predetermined variance value. If the variance value HLDV is smaller than or equal to the predetermined variance value HLDV (RF5: YES), the CPU 40 proceeds to RF6. If the variance value HLDV is greater than the predetermined variance value HLDV (RF5: NO), the CPU 40 proceeds to RF7. The predetermined variance value may be, for example, 0.005. With the predetermined variance value being set at 0.005, even when an edge position EP from the lateral end of the original sheet GS is erroneously recognized as the linear edge position LEP, the leading-end line HEL may calculate the leading-end line HEL based on an alternative linear edge position LEP between the most upstream leading-end position UHP and the central pixel position adopted in RF9 (see below) or an alternative linear edge position LEP between the central pixel position and the most downstream leading-end position DHP adopted in RF8 (see below) so that the leading-end line HEL may be obtained accurately without the influence of the edge position EP from the lateral end of the original sheet GS.

In RF6, the CPU 40 calculates the leading-end line HEL based on the linear edge positions LEP. In particular, the CPU 40 may apply the least square method to each liner edge position LEP extracted in RF1-RF3 to obtain the leading-end line HEL. The leading-end line calculating process RA4 ends at the end of the process in RF6.

In RF5, if the variance value HLDV is greater than the predetermined variance value HLDV (RF5: NO), in RF7, the CPU 40 determines whether the leading-end line HEL inclines lower-rightward or lower-leftward. In particular, the CPU 40 may determine that the leading-end line HEL inclines lower-rightward when the leading-end line HEL inclines toward upstream in the conveying direction FD as the leading-end line HEL extends upstream along the main-scanning direction MD (RF7: LOWER-RIGHTWARD), and the CPU 40 may proceed to RF8. On the other hand, the CPU 40 may determine that the leading-end line HEL inclines lower-leftward when the leading-end line HEL inclines toward upstream in the conveying direction FD as the leading-end line HEL extends downstream along the main-scanning direction MD (RF7: LOWER-LEFTWARD), and the CPU 40 may proceed to RF9.

In RF8, the CPU 40 alternatively adopts the linear edge position LEP contained in a range between the central pixel position and the most downstream leading-end position DHP as a new linear edge position LEP. After RF8, The CPU 40 proceeds to RF10.

In RF7, if the CPU 40 determines that the leading-end line HEL inclines lower-leftward (FR7: LOWER-LEFTWARD), in RF9, the CPU 40 alternatively adopts the linear edge position LEP contained in a range between the most upstream leading-end position UHP and the central pixel position as a new linear edge position LEP.

Following RF8 or RF9, in RF10, the CPU 40 calculate the leading-end line HEL. In particular, the CPU 40 may calculate the leading-end line HEL based on the linear edge positions LEP. In particular, the CPU 40 may apply the least square method to each liner edge position LEP adopted in either RF8 or RF9 to obtain the leading-end line HEL. The leading-end line calculating process RA4 ends at the end of the process in RF10. The flow returns to the calculating process R3 to obtain the upstream corner position UHVP and the downstream corner position DHVP (see FIG. 6).

[Sample]

An exemplary sample of the procedure to detect the most upstream leading-end position UHP, the most upstream lateral-end position USP, the most downstream leading-end position DHP, and the most downstream lateral-end position DSP in the image reading apparatus 1 when the original sheet GS being conveyed skews as shown in FIG. 12B will be described with reference to FIGS. 12A-12B. In the following paragraphs, a pixel position may be expressed in numbers of the main-scanning position MDP (X) and the edge position EP (Y) in parenthesis such as (X, Y).

In R2 (see FIG. 5), the edge-position detector 49 may save the pixel positions (1, 0), (2, 0), (3, 160), . . . (intermediate pixel positions omitted), (1241, 100), . . . (intermediate pixel positions omitted), . . . (2231, 1), (2232, 0) . . . (intermediate pixel positions omitted), (2451, 0) . . . (intermediate pixel positions omitted), (2461, 45), . . . (intermediate pixel positions omitted), (2471, 90), . . . (intermediate pixel positions omitted), and (2481, 135) in the RAM 42.

In this paragraph, described will be the flow of processes to detect the most upstream leading-end position UHP and the most upstream lateral-end position USP. As shown in FIG. 12B, a range, along the conveying direction FD between the first line and the 500th line and along the main-scanning direction MD between the central pixel position and the third pixel position with the main-scanning position MDP "3" does not contain an edge position EP having a value "0" indicating edge absence or "no edge NE." Therefore, in RC1-RC3 as shown in FIG. 8, the CPU 40 appoints pixel positions, which are apart upstream from the central pixel position or from the currently appointed objective position TMDP for the predetermined quantity of pixels along the main-scanning direction MD, as the objective positions TMDP consecutively within the range along the main-scanning direction MD between the 1241th pixel position being the central pixel position and the foremost pixel position. When the foremost pixel position is appointed as the objective position TMDP, in RC2, the CPU 40 determines that no edge is detected in the objective position TMDP and proceeds to RC5. In RC5-RC6, the CPU 40 sequentially appoints the pixel positions in a range along the main-scanning direction MD between the foremost pixel position and the third pixel position having the main-scanning position MDP "3" row by row downstream along the main-scanning direction MD as the search position DMDP. When the third pixel position is appointed as the search position DMDP, in RC6, the CPU 40 determines that an edge is detected in the main-scanning position MDP "3" and proceeds to RC7. The CPU 40 saves the main-scanning position MDP "3" indicating the third pixel position and the edge position EP "160" indicating the line of the third pixel position as the most upstream leading-end position UHP in the RAM 42. In RC8, the CPU 40 determines the objective position TMDP is the foremost pixel position and proceeds to RC9. In RC9, the CPU 40 saves the pixel position of the most upstream leading-end position UHP as the most upstream lateral-end position USP in the RAM 42.

In this paragraph, described will be the flow of processes to detect the most downstream leading-end position DHP. As shown in FIG. 12B, a range, along the conveying direction FD between the first line and the 500th line and along the main-scanning direction MD between the central pixel position and the 2231th pixel position with the main-scanning position MDP "2231," does not contain an edge position EP having the value "0" indicating edge absence or "no edge NE." Therefore, in RG1-RG3 as shown in FIG. 13, the CPU 40 appoints pixel positions, which are apart downstream from the central pixel position or from the currently appointed objective position TMDP for the predetermined quantity of pixels along the main-scanning direction MD, as the objective positions TMDP consecutively within the range along the main-scanning direction MD between the central pixel position and the 2241th pixel position. When the 2241th pixel position is appointed as the objective position TMDP, in RG2, the CPU 40 determines that no edge is detected in the objective position TMDP and proceeds to RG5. In RG5-RG6, the CPU 40 sequentially appoints the pixel positions in a range along the main-scanning direction MD between the 2241th pixel position having the main-scanning position MDP "2241" and the 2231th pixel position having the main-scanning position MP "2231" row by row upstream along the main-scanning direction MD as the search position DMDP. When the 2231th pixel position is appointed as the search position DMDP, in RG6, the CPU 40 determines that an edge is detected in the main-scanning position MDP "2231" and proceeds to RG7. The CPU 40 saves the main-scanning position MDP "2231" indicating the 2231th pixel position and the edge position EP "1" indicating the line of the 2231th pixel position as the most downstream leading-end position DHP in the RAM 42.

In this paragraph, described will be the flow of processes to detect the most downstream lateral-end position DSP. In RH1-RH8 shown in FIG. 14, the CPU appoints pixel positions, which are apart downstream from the 2241th pixel position or from the currently appointed objective position TMDP for the predetermined quantity of pixels along the main-scanning direction MD, as the objective position TMDP consecutively within the range along the main-scanning direction MD between the 2241th pixel position having the main-scanning position MDP "2241" and the 2461th pixel position having the main-scanning position MDP "2461". When the 2461th pixel position is appointed as the objective position TMDP, in RH3, the CPU 40 adds "1" to the continuity count value CCT, which makes the continuity count value CCT "1." When the 2471th pixel position is appointed as the objective position TMDP, in RH3, the CPU 40 adds "1" to the continuity count value CCT, which makes the continuity count value CCT "2." When the 2481th pixel position is appointed as the objective position TMDP, in RH3, the CPU 40 adds "1" to the continuity count value CCT, which makes the continuity count value CCT "3." In RH4, the CPU 40 determines that the continuity count value CCT is greater than or equal to "3." The CPU 40 saves the main-scanning position MDP "2481" indicating the 2481th pixel position and the edge position EP "135" indicating the line of the 2481th pixel position as the most downstream lateral-end position USP in the RAM 42.

<Benefits>

According to the embodiment described above, in RC1-RC3 in the most upstream leading-end position detecting process RB1, the pixel positions, which are apart upstream from one another for the predetermined quantity of number, in the range along the main-scanning direction MD between the central pixel position and the foremost pixel position are appointed as the objective position TMDP until the edge is no longer detected in the objective position TMDP. In RC5 and RC6, the pixel positions in the range between the objective position TMDP, in which no edge was detected, and the objective position TMDP, in which the edge was detected, are appointed one by one downstream along the main-scanning direction MD as the search position DMDP. In RC7, the search position DMDP, in which the edge was detected, and the edge position EP of the search position DMDP in terms of the conveying direction FD are saved as the most upstream leading-end position UHP. The most downstream leading-end position DHP is saved in the similar manner as the most downstream leading-end position detecting process RE1. Thus, after the objective positions TMDP are appointed intermittently at the interval of the distance equivalent to the predetermined quantity of pixels, the search positions DMDP are appointed one by one sequentially. Therefore, the most upstream leading-end position UHP and the downstream position DHP may be detected promptly and accurately. In this regard, even when the original sheet GS skews, and the image reader 24 starts reading the leading end area of the original sheet GS from a midst position in the conveying direction FD, the width of the original sheet GS, i.e., the size of the original sheet GS in the main-scanning direction MD, may be accurately determined.

In RD1-RD8 in the most upstream lateral-end detecting process RB3, the pixel positions, which are apart from one another for the predetermined quantity of pixels in the range between the objective position TMDP, in which no edge was detected, and the foremost pixel position, are appointed intermittently upstream along the main-scanning direction MD as the objective positions TMDP. In RD2, RD3, and RD7, when the edge is detected in the objective position TMDP, the continuity count value CCT is incremented by 1; or when no edge is detected in the objective position TMDP, a value 0 is set in the continuity count value CCT. In RD4-RD5, when the continuity count value CCT indicates 3 or a larger value, the objective position TMDP, which caused the continuity count value CCT to be greater than or equal to 3, and the edge position EP in terms of the conveying direction FD associated with the objective position TMDP are saved as the most upstream lateral-end position USP. The most downstream lateral-end position DSP is detected in the similar manner as the most upstream lateral-end position detecting process RE3. Thus, the objective positions TMDP, which caused the continuity count value CCT to be greater than or equal to 3, are saved as the most upstream lateral-end position USP and the most downstream lateral-end position DSP respectively. Therefore, even if an edge is erroneously detected due to influence of a noise or an obstacle, the upstream lateral position USP and the most downstream lateral-end position DSP may be detected correctly.

In RF5 in the leading-end line calculation process RA4, the sample variance value among the inclinations of all the lines, each between adjoining two pixel positions, within the linear edge positions LEP is obtained as the variance value HLDV. In RF5-RF6, when the variance value HLDV is smaller than or equal to the predetermined variance value, the leading-end line HEL is achieved by applying the least square method to all of the linear edge positions LEP. Meanwhile, in RF7, RF8, RF9, and RF10, if the leading-end line HEL inclines lower-rightward, the leading-end line HEL is obtained by applying the least square method to the linear edge positions LEP contained in the range along the main-scanning direction MD between the central pixel position and the most downstream leading-end position DHP; or if the leading-end line HEL inclines lower-leftward, the leading-end line HEL is obtained by applying the least square method to the linear edge positions LEP contained in the range along the main-scanning direction MD between the central pixel position and the most upstream leading-end position UHP. Thus, while the lateral end of the original sheet GS may be erroneously detected as the leading end, the edge-position detector 49 may calculate the leading-end line HEL correctly.

More Examples

Although an example of carrying out the invention has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters.

For example, the image reading apparatus 1 may be formed as a part of a multifunction peripheral device having a printer. For another example, the image reading apparatus 1 may not necessarily be equipped with the single image reader 24 and the single white reference board 34 but may be equipped with two image readers and two white reference boards, which may read both sides of the original sheet GS.

For another example, the most upstream lateral-end position USP may not necessarily be detected based on the continuity count value CCT being greater than or equal to the threshold value. For example, pixel positions in a predetermined range along the main-scanning direction MD between the central pixel position and the foremost pixel position may be sequentially appointed, and if the edges are detected in all of the pixel positions in the predetermined range, the pixel positions may be determined and updated consecutively as the most upstream lateral-end position USP.

For another example, the variant value HLDV may not necessarily be obtained from the calculation of the sample variance value among the linear edge positions LEP but may be, for example, obtained from other variance value or deviation indicating positional dispersion.

For another example, the leading-end line HEL may not necessarily be obtained through the least square method applied to the linear edge positions LEP. For example, the leading-end line HEL may be calculated from a line extending through the most upstream leading-end position UHP and the most downstream leading-end position DHP, from a line extending through the most upstream leading-end line UHP and the central pixel position, or from a line extending through a leading-end position at the central pixel position and the most downstream leading-end position DHP.

For another example, the predetermined quantity of pixels, for which a new objective position TMDP should be apart from a current objective position TMDP, may not necessarily be limited to 10 but may be more than or less than 10. The quantity 10 in the embodiment described above is based on an assumption that the size of the obstacle such as paper dust may be 0.8 mm. However, the quantity of the pixels may be modified depending on the environment to use the image reading apparatus 1. For example, in an environment where an obstacle with a dimension 0.4 mm is assumable, the quantity of the pixels may be 5; whereas in an environment where an obstacle with a dimension 1.6 mm is assumable, the quantity of the pixels may be 20. For another example, if the resolution in the main-scanning direction MD is 600 dpi, whereas the resolution in the main-scanning direction MD in the embodiment described above is 300 dpi, the quantity of the pixels may be 20.

What is claimed is:

1. An image reading apparatus, comprising:
    a conveyer configured to convey a sheet to be read downstream along a sub-scanning direction;
    a sheet tray configured to support the sheet at a position on a supporting surface with reference to a central position located at a center of the supporting surface in a main-scanning direction, the main-scanning direction intersecting orthogonally with the sub-scanning direction;
    an obtaining device including a line sensor, the line sensor comprising a plurality of sensor components aligning in line along the main-scanning direction, the plurality of sensor components including a foremost sensor component located at a most upstream position in the line along the main-scanning direction and a rearmost sensor component located at a most downstream position in the line along the main-scanning direction, each sensor component being configured to read an image element corresponding to a pixel on the sheet, the line sensor being configured to read a plurality of lines of images extending along the main-scanning direction on the sheet being conveyed from the sheet tray downstream in the sub-scanning direction, the obtaining device being configured to obtain read-image data including image data of the plurality of lines of images read by the line sensor,
    a memory;
    a determining device configured to:
        determine edge positions contained in a predetermined area defined by a main-scanning range and a sub-scanning range in the read-image data and store information concerning pixels in the predetermined area indicating the edge positions in a storage area in the memory, the main-scanning range being a range of pixels in the read-image data aligning along the main-scanning direction between a foremost pixel position, which is a position of pixels read by the foremost sensor component, and a rearmost pixel position, which is a position of pixels read by the rearmost sensor component, the sub-scanning range being a range of pixels in the read-image data aligning along the sub-scanning direction between an upstream pixel position, which is a position of pixels in a most upstream line among the plurality of lines of images, and a pixel position of another line of pixels, which are apart downstream in the sub-scanning direction from the upstream pixel position for a first predetermined distance,
        the determining device being configured to search for edges of the sheet through the pixels in the predetermined area in the read-image data from the upstream pixel position downstream along the sub-scanning direction at each pixel position in the main-scanning direction, and
        the determining device being configured to save the pixel position in the main-scanning direction in the storage area in the memory as the information indicating the edge position if colors in the pixels within the sub-scanning range in the read-image data shifted from white to black along the sub-scanning direction for a first time at the pixel position in the main-scanning direction, and the determining device being configured to save information indicating edge absence in the storage area in the memory if the colors in the pixels within the sub-scanning range in the read-image data do not shift from white to black at the pixel position in the main-scanning direction; and
    a controller configured to:
        examine the information concerning the pixels stored in the storage area in the memory along the main-scanning direction consecutively upstream from a central pixel position, which is a position of pixels read by a central sensor component among the plurality of sensor components located at the central position, to the foremost pixel position and determine whether the information concerning each of the examined pixels indicates the edge position or edge absence;
        detect a pixel position, which is farthest upstream from the central pixel position along the main-scanning direction and of which information concerning the pixel in the storage area in the memory is determined to indicate the edge position, as an upstream leading-end position, among the pixel positions within a range along the main-scanning direction between the central pixel position and an upstream no-edge pixel position, which is upstream from the central pixel position in the main-scanning direction and of which information concerning the pixel in the storage area in the memory is determined to indicate edge absence;

examine the information concerning the pixels stored in the storage area in the memory along the main-scanning direction consecutively downstream from the central pixel position to the rearmost pixel position and determine whether the information concerning each of the examined pixels indicates the edge position or edge absence;

detect a pixel position, which is farthest downstream from the central pixel position along the main-scanning direction and of which information concerning the pixel in the storage area in the memory is determined to indicate the edge position, as a downstream leading-end position, among the pixel positions within a range along the main-scanning direction between the central pixel position and a downstream no-edge pixel position, which is downstream from the central pixel position in the main-scanning direction and of which information concerning the pixel in the storage area in the memory is determined to indicate edge absence;

detect pixel positions, of which information concerning the pixels in the storage area in the memory is determined to indicate the edge positions sequentially, as upstream continuing pixel positions, among the pixel positions within a range along the main-scanning direction between the upstream no-edge pixel position and the foremost pixel position;

detect a pixel position, which is farthest from the central pixel position along the main-scanning direction, among the upstream continuing pixel positions as an upstream lateral-end position;

detect pixel positions, of which information concerning the pixels in the storage area in the memory is determined to indicate the edge positions sequentially, as downstream continuing pixel positions, among the pixel positions within a range along the main-scanning direction between the downstream no-edge pixel position and the rearmost pixel position;

detect a pixel position, which is farthest from the central pixel position along the main-scanning direction, among the downstream continuing pixel positions as a downstream lateral-end position;

calculate a line representing an upper end of the sheet based on the upstream leading-end position and the downstream leading-end position;

calculate an upstream corner position based on the upstream lateral-end position and the line representing the upper end of the sheet;

calculate a downstream corner position based on the downstream lateral-end position and the line representing the upper end of the sheet; and calculate a width of the sheet in the main-scanning direction based on the upstream corner position and the downstream corner position.

2. The image reading apparatus according to claim 1, wherein, for determining whether the information concerning the pixels between the central pixel position and the foremost pixel position indicates the edge positions or edge absence, the controller is configured to examine the information concerning the pixels stored in the storage area in the memory consecutively along the main-scanning direction upstream from the central pixel position to the foremost pixel position at an interval of a second predetermined distance;

wherein, for detecting the upstream leading-end position, the controller is configured to:

examine the information concerning the pixels stored in the storage area in the memory downstream along the main-scanning direction from the upstream no-edge pixel position toward the central pixel position sequentially for each pixel position in the range along the main-scanning direction between the central pixel position and the upstream no-edge pixel position and determine whether the information concerning the examined pixels in the storage area in the memory indicates the edge positions or edge absence; and detect the pixel position, of which information concerning the pixel is in the storage area in the memory is determined to indicate the edge position for a first time in sequential determinations along the main-scanning direction in the range from the upstream no-edge pixel position toward the central position, as the upstream leading-end position;

wherein, for determining whether the information concerning the pixels between the central pixel position and the rearmost pixel position indicates the edge positions or edge absence, the controller is configured to examine the information concerning the pixels stored in the storage area in the memory consecutively along the main-scanning direction downstream from the central pixel position to the rearmost pixel position at the interval of the second predetermined distance;

wherein, for detecting the downstream leading-end position, the controller is configured to:

examine the information concerning the pixels stored in the storage area in the memory upstream along the main-scanning direction from the downstream no-edge pixel position toward the central pixel position sequentially for each pixel position in the range along the main-scanning direction between the central pixel position and the downstream no-edge pixel position and determine whether the information concerning the examined pixels in the storage area in the memory indicates the edge positions or edge absence; and detect the pixel position, of which information concerning the pixel is in the storage area in the memory is determined to indicate the edge position for a first time in sequential determinations along the main-scanning direction in the range from the downstream no-edge pixel position toward the central position, as the downstream leading-end position.

3. The image reading apparatus according to claim 2, wherein, for detecting the upstream continuing pixel positions, the controller is configured to:

add a value 1 to an upstream continuity count value if the information concerning the examined pixel in the storage area in the memory is determined to indicate the edge position;

set a value "0" to the upstream continuity count value if the information concerning the examined pixel in the storage area in the memory is determined to indicate edge absence; and detect the pixel position, of which information concerning the examined pixel in the storage area in the memory caused the upstream continuity count value to be greater than or equal to "3," as the upstream continuing pixel position; and wherein, for detecting the downstream continuing pixel positions, the controller is configured to:

add a value 1 to a downstream continuity count value if the information concerning the examined pixel in the storage area in the memory is determined to indicate the edge position;

set a value "0" to the downstream continuity count value if the information concerning the examined pixel in the storage area in the memory is determined to indicate edge absence; and detect the pixel position, of which information concerning the examined pixel in the storage area in the memory caused the downstream continuity count value to be greater than or equal to "3," as the downstream continuing pixel position.

4. The image reading apparatus according to claim 3,
wherein the controller is configured to detect the upstream leading-end position as the upstream lateral-end position if, after detecting the upstream leading-end position, the controller failed to detect the upstream continuity pixel position; and wherein the controller is configured to detect the downstream leading-end position as the downstream lateral-end position if, after detecting the downstream leading-end position, the controller failed to detect the downstream continuity pixel position.

5. The image reading apparatus according to claim 1,
wherein, for calculating the line representing the upper end of the sheet, the controller is configured to:

calculate a sample variance value among all of inclinations in lines, each extending through two adjoining pixel positions among a plurality of pixel positions between the upstream leading-end position and the downstream leading-end position, based on which the line representing the upper end of the sheet is calculated, as a variance value;

calculate the line representing the upper end of the sheet based on the edge positions at pixel positions between the central pixel position and the downstream leading-end position if the variance value is greater than a predetermined value and if the line representing the upper end of the sheet extends toward downstream along the main-scanning direction and toward downstream along the sub-scanning direction;

calculate the line representing the upper end of the sheet based on the edge positions at pixel positions between the central pixel position and the upstream leading-end position if the variance value is greater than the predetermined value and if the line representing the upper end of the sheet extends toward downstream along the main-scanning direction and toward upstream along the sub-scanning direction; and calculate the line representing the upper end of the sheet based on the edge positions at pixel positions between the upstream leading-end position and the downstream leading-end position if the variance value is smaller than or equal to the predetermined value.

6. The image reading apparatus according to claim 1,
wherein, for calculating the upstream corner position, the controller is configured to calculate an upstream perpendicular line extending orthogonally to the line representing the upper end of the sheet and through the upstream lateral-end position and calculates a position of an intersection between the calculated upstream perpendicular line and the line representing the upper end of the sheet as the upstream corner position; and wherein, for calculating the downstream corner position, the controller is configured to calculate a downstream perpendicular line extending orthogonally to the line representing the upper end of the sheet and through the downstream lateral-end position and calculates a position of an intersection between the calculated downstream perpendicular line and the line representing the upper end of the sheet as the downstream corner position.

7. The image reading apparatus according to claim 1,
wherein, in order to calculate the width of the sheet in the main-scanning direction, the controller is configured to calculate a distance between the upstream corner position and the downstream corner position as the width of the sheet.

8. The image reading apparatus according to claim 1,
wherein, for calculating the upper end of the sheet, the controller is configured to calculate the line representing the upper end of the sheet by applying the least square method to the edge positions located between the upstream leading-end position and the downstream leading-end position.

* * * * *

UNITED STATES PATENT AND TRADEMARK OFFICE
CERTIFICATE OF CORRECTION

PATENT NO.        : 10,097,722 B1
APPLICATION NO.   : 15/928358
DATED             : October 9, 2018
INVENTOR(S)       : Naoyuki Nakamura Page 1 of 1

It is certified that error appears in the above-identified patent and that said Letters Patent is hereby corrected as shown below:

On the Title Page

<u>Assignee, Item (73)</u>
Please change: "Assignee: Brother Kogyo Kabushikia Kaisha, Nagoya-Shi (JP)" to -- Assignee: Brother Kogyo Kabushiki Kaisha, Nagoya-Shi (JP) --

Signed and Sealed this
Twenty-seventh Day of November, 2018

Andrei Iancu
*Director of the United States Patent and Trademark Office*